US009236631B2

(12) United States Patent
Kwon et al.

(10) Patent No.: US 9,236,631 B2
(45) Date of Patent: Jan. 12, 2016

(54) ELECTRODE ASSEMBLY INCLUDING ELECTRODE UNITS HAVING THE SAME WIDTH AND DIFFERENT LENGTHS, AND BATTERY CELL AND DEVICE INCLUDING THE ELECTRODE ASSEMBLY

(71) Applicant: LG Chem, Ltd., Seoul (KR)

(72) Inventors: Sung-Jin Kwon, Daejeon (KR);
Ki-Woong Kim, Daejeon (KR);
Soon-Ho Ahn, Daejeon (KR);
Dong-Myung Kim, Daejeon (KR);
Young-Hoon Kim, Daejeon (KR);
Sung-Han Yoon, Daejeon (KR);
Seung-Min Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/261,907

(22) Filed: Apr. 25, 2014

(65) Prior Publication Data

US 2014/0234682 A1    Aug. 21, 2014

Related U.S. Application Data

(63) Continuation of application No. PCT/KR2013/010470, filed on Nov. 18, 2013.

(30) Foreign Application Priority Data

Nov. 22, 2012 (KR) .................. 10-2012-0133154
Mar. 15, 2013 (KR) .................. 10-2013-0028289
Nov. 13, 2013 (KR) .................. 10-2013-0137566

(51) Int. Cl.
*H01M 10/04* (2006.01)
*H01M 10/0525* (2010.01)
(Continued)

(52) U.S. Cl.
CPC ...... *H01M 10/0431* (2013.01); *H01M 10/0463* (2013.01); *H01M 10/0525* (2013.01);
(Continued)

(58) Field of Classification Search
CPC .................................................. H01M 10/0431
USPC ........................... 429/94, 209, 246, 211, 163
See application file for complete search history.

(56) References Cited

U.S. PATENT DOCUMENTS 6,224,995 B1    5/2001    Fauteux et al.
6,258,478 B1    7/2001    Kim
(Continued)

FOREIGN PATENT DOCUMENTS

CN    1185860 A    6/1998
CN    1230035 A    9/1999
(Continued)

OTHER PUBLICATIONS

Chinese Office Action for Application No. 201380001748.7 dated Aug. 1, 2014.
(Continued)

*Primary Examiner* — Stewart Fraser
(74) *Attorney, Agent, or Firm* — Lerner, David, Littenberg, Krumholz & Mentlik, LLP

(57) ABSTRACT

There are provided an electrode assembly, a battery cell including the electrode assembly, and a device including the electrode assembly. The electrode assembly includes a combination of two or more electrode units having the same width and different lengths, wherein the electrode units are stacked so that a stepped portion is formed between the electrode units, and electrodes having different polarities face each other at an interface between the electrode units.

34 Claims, 8 Drawing Sheets

(51) Int. Cl.
  *H01M 10/0585* (2010.01)
  *H01M 10/0587* (2010.01)
  *H01M 10/0565* (2010.01)
  *H01M 4/02* (2006.01)

(52) U.S. Cl.
  CPC ...... *H01M10/0585* (2013.01); *H01M 10/0587* (2013.01); *H01M 10/0565* (2013.01); *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 8,945,743 | B2 | 2/2015 | Kwon et al. |
| 2001/0005561 | A1 | 6/2001 | Yamada et al. |
| 2002/0034691 | A1 | 3/2002 | Segawa |
| 2004/0041537 | A1 | 3/2004 | Ishida et al. |
| 2004/0172808 | A1 | 9/2004 | Fraser et al. |
| 2005/0191545 | A1 | 9/2005 | Bowles et al. |
| 2006/0062904 | A1 | 3/2006 | West et al. |
| 2006/0115736 | A1 | 6/2006 | Hashimoto et al. |
| 2007/0059599 | A1 | 3/2007 | Rubino et al. |
| 2007/0196732 | A1* | 8/2007 | Tatebayashi et al. ......... 429/181 |
| 2007/0218355 | A1 | 9/2007 | Ryu et al. |
| 2009/0296442 | A1 | 12/2009 | Chang et al. |
| 2010/0104930 | A1 | 4/2010 | Kim et al. |
| 2010/0203384 | A1 | 8/2010 | West et al. |
| 2010/0319187 | A1 | 12/2010 | Kim et al. |
| 2011/0008656 | A1 | 1/2011 | Tanahashi et al. |
| 2011/0183171 | A1 | 7/2011 | Moon et al. |
| 2011/0183183 | A1 | 7/2011 | Grady et al. |
| 2011/0287304 | A1 | 11/2011 | Zinck et al. |
| 2012/0015236 | A1 | 1/2012 | Spare |
| 2012/0107654 | A1 | 5/2012 | Bhardwaj et al. |
| 2014/0120394 | A1 | 5/2014 | Kwon et al. |
| 2014/0255743 | A1 | 9/2014 | Kwon et al. |
| 2015/0010799 | A1 | 1/2015 | Kwon et al. |

FOREIGN PATENT DOCUMENTS

| | | | |
|---|---|---|---|
| CN | 2773917 | Y | 4/2006 |
| CN | 101652893 | A | 2/2010 |
| EP | 1032068 | A2 | 8/2000 |
| JP | H03152881 | A | 6/1991 |
| JP | H09213366 | A | 8/1997 |
| JP | H09293536 | A | 11/1997 |
| JP | 2001028275 | A | 1/2001 |
| JP | 2001043899 | A | 2/2001 |
| JP | 2001167743 | A | 6/2001 |
| JP | 2004-111219 | A | 4/2004 |
| JP | 2006-173000 | A | 6/2006 |
| JP | 2008159419 | A | 7/2008 |
| JP | 2010135265 | A | 6/2010 |
| JP | 2011-081931 | A | 4/2011 |
| JP | 2012054003 | A | 3/2012 |
| KR | 1999-0066181 | | 8/1999 |
| KR | 20030066960 | A | 8/2003 |
| KR | 20080087686 | A | 10/2008 |

OTHER PUBLICATIONS

International Search Report for Application No. PCT/KR2013/002140 dated Jun. 21, 2013.
International Search Report for Application No. PCT/KR2013/002142 dated Jun. 21, 2013.
Machine Translation of KR 20030066960, Chang et al., Aug. 14, 2003.
International Search Report for Application No. PCT/KR2013/010470 dated Feb. 26, 2014.
Written Opinion for PCT/KR2013/010470 mailed on Feb. 26, 2014.
Chinese Office Action for Application No. 201380003648.8 dated Mar. 6, 2015.
Office Action from Chinese Application No. 201380001747.2, dated Aug. 5, 2014.
U.S. Appl. No. 14/707,850, filed Aug. 5, 2015.
Search report from European Application No. 13840138.5, dated Apr. 30, 2015.
Machine Translation of: KR 20030066960, Jang, Aug. 14, 2003.
Supplemental Search Report from European Application No. 13 77 8081, dated Oct. 2, 2015.
Supplemental Search Report from European Application No. 13 77 7724, dated Aug. 27, 2015.

* cited by examiner (a)

(b)

RATIOS OF N/P REVERSIBLE CAPACITIES PER UNIT AREA AT INTERFACES BETWEEN ELECTRODE UNITS

RATIOS OF N/P THICKNESSES AT INTERFACES BETWEEN ELECTRODE UNITS

ELECTRODE ASSEMBLY INCLUDING ELECTRODE UNITS HAVING THE SAME WIDTH AND DIFFERENT LENGTHS, AND BATTERY CELL AND DEVICE INCLUDING THE ELECTRODE ASSEMBLY

CROSS-REFERENCE TO RELATED APPLICATIONS

This application is a continuation of PCT/KR2013/010470, filed on Nov. 18, 2013 which claims the benefit of Korean Application Nos. 10-2012-0133154, filed Nov. 22, 2012 and 10-2013-0137566, filed Nov. 13, 2013 and 10-2013-0028289, filed Mar. 15, 2013 in the Korean Intellectual Property Office, the disclosures of which are incorporated herein by reference.

FIELD OF THE INVENTION

The present disclosure relates to an electrode assembly having a stepped portion, and more particularly, to an electrode assembly including electrode units having the same width and different lengths, the electrode units being configured such that electrodes having different polarities face each other at interfaces between the electrode units, and a battery including the electrode assembly.

In addition, the present disclosure relates to a battery cell, a battery pack, and a device that include the electrode assembly.

BACKGROUND OF THE INVENTION

Demand for secondary batteries has markedly increased with the development and increasing usage of mobile devices, and particularly, secondary batteries having high energy density, high operating voltages, easy-to-store characteristics, and relatively long lifespans are widely used as power sources in various electronic products such as mobile devices.

Generally, secondary batteries such as lithium secondary batteries are formed by disposing an electrode assembly and an electrolyte in a battery case and sealing the battery case. Secondary batteries may be classified as cylindrical, prism, and pouch type batteries according to the shapes thereof, and lithium ion batteries, lithium ion polymer batteries, and lithium polymer batteries according to the types of electrolytes used therein. Demand for thin prism or pouch type batteries has increased as the size of mobile devices has decreased, and particularly, pouch type batteries are noteworthy due to being relatively lightweight.

Electrode assemblies accommodated in battery cases may be classified into jelly-roll (wound), stacked, and stacked/folded (combination) types according to the structures thereof. Generally, jelly-roll type electrode assemblies may be manufactured by coating metal foil used as a current collector with an electrode active material, pressing the metal foil, cutting the metal foil into a band having a desired width and length, separating positive and negative electrodes using a separation film, and winding the separation film in a spiral shape. Stacked type electrode assemblies may be manufactured by vertically stacking a negative electrode, a separator, and a positive electrode. Stacked/folded type electrode assemblies may be manufactured by placing respective electrode stacks having a single electrode or a structure of a negative electrode/a separator/a positive electrode on a long sheet of separation film, and folding the separation film.

However, in the related art, electrode assemblies are usually manufactured by stacking unit cells or electrodes having the same size and thus have limited shapes. Therefore, there are many limitations in terms of battery designs. To address such limitations, methods of manufacturing batteries having stepped portions by using electrodes or unit cells having different sizes have been introduced. However, since such batteries having stepped portions are manufactured by cutting positive electrode plates and negative electrode plates into different sizes to form unit cells having different sizes and stacking the unit cells, the thicknesses of layers of the batteries are limited to multiples of the thicknesses of the unit cells, and thus the degree of design freedom of the batteries is relatively low.

Furthermore, the above-mentioned technique of the related art only discloses a simple idea of changing the design of a battery by cutting positive and negative electrodes into desired sizes and stacking the positive and negative electrodes. That is, a specific method of manufacturing batteries having practically useful battery characteristics is not disclosed. For example, although unit cells of a battery having a stepped portion have no individual operational errors, the unit cells may have overall operation errors, according to the stacked structure of the unit cells, or the electrical capacity of the battery having a stepped portion may be very low as compared with the capacity of a battery having the same volume. In addition, as charging and discharging cycles are repeated, interfaces between layers of the battery having a stepped portion may swell excessively, lowering the lifespan of the battery and making it difficult to use the battery practically. However, in the related art, batteries having stepped portions are not designed with the prevention of such problems in mind.

Therefore, high-capacity, durable electrode assemblies that can be variously designed according to the shapes of devices in which the electrode assemblies are to be used, and the development of batteries using such electrode assemblies is needed.

SUMMARY OF THE INVENTION

Aspects of the present disclosure may provide an electrode assembly having a reduced thickness, improved electrical capacity characteristics, and suitability for various designs, and a battery cell and a device including the electrode assembly.

According to an aspect of the present disclosure, an electrode assembly may include a combination of two or more electrode units having the same width and different lengths, wherein the electrode units may be stacked so that a stepped portion is formed between the electrode units, and electrodes having different polarities may face each other at interfaces between the electrode units.

At the interfaces between the two or more electrode units having the same width and different lengths, a negative electrode of a relatively long electrode unit may face a positive electrode of a relatively short electrode unit.

After 500 charging and discharging cycles at 25° C., the electrical capacity of the electrode assembly may be 60% or more of an electrical capacity measured after one charging and discharging cycle, and the overall thickness of the electrode assembly may be varied by 15% or less as compared with an overall thickness measured after one charging and discharging cycle. For this, positive and negative electrodes facing each other at interfaces between the electrode units having different lengths may be balanced According to the aspect of the present disclosure, the electrode assembly may include n+1 or more electrode units, and the ratio of $N_n$ to $P_n$ ($N_n/P_n$) may not be greater than the ratio of $N_n$ to $P_{n+1}$ ($N_n/P_{n+1}$) where n denotes an integer equal to or greater than 1, $N_n$ denotes reversible capacity per unit area of an negative electrode of the nth longest electrode unit, $P_n$ denotes reversible capacity per unit area of a positive electrode of the nth longest electrode unit, and $P_{n+1}$ denotes reversible capacity per unit area of a positive electrode of the (n+1)th longest electrode unit. In other words, the electrode assembly may satisfy Formula 1.

$$N_n/P_n \leq N_n/P_{n+1} \qquad \text{Formula 1:}$$

If the electrode assembly includes n+2 or more electrode units having different lengths, the ratio of $N_n$ to $P_{n+1}$ ($N_n/P_{n+1}$) may not be smaller than the ratio of $N_n$ to $P_n$ ($N_n/P_n$) and may not be greater than the ratio of $N_{n+1}$ to $P_{n+1}$ ($N_{n+1}/P_{n+1}$) where $N_n$ denotes reversible capacity per unit area of a negative electrode of the nth longest electrode unit, $P_n$ denotes reversible capacity per unit area of a positive electrode of the nth longest electrode unit, $N_{n+1}$ denotes reversible capacity per unit area of an negative electrode of the (n+1)th longest electrode unit, $P_{n+1}$ denotes reversible capacity per unit area of a positive electrode of the (n+1)th longest electrode unit, and $P_{n+2}$ denotes reversible capacity per unit area of a positive electrode of the (n+2)th longest electrode unit. In addition, the ratio of $N_{n+1}$ to $P_{n+1}$ ($N_{n+1}/P_{n+1}$) may not be greater than the ratio of $N_{n+1}$ to $P_{n+2}$ ($N_{n+1}/P_{n+2}$). In other words, if the electrode assembly includes three or more kinds of electrode units having different lengths, the electrode assembly may satisfy Formula 2.

$$N_n/P_n \leq N_n/P_{n+1} \leq N_{n+1}/P_{n+1} \leq N_{n+1}/P_{n+2} \qquad \text{Formula 2:}$$

If the electrode assembly including three or more kinds of electrode units having different lengths is formed in a manner such that the (n+2)th longest electrode unit is disposed between the nth longest electrode unit and the (n+1)th longest electrode unit, the ratio of $N_{n+1}$ to $P_{n+2}$ ($N_{n+1}/P_{n+2}$) may not be smaller than the ratio of $N_n$ to $P_{n+2}$ ($N_n/P_{n+2}$). In other words, the electrode assembly may satisfy Formula 3.

$$N_n/P_{n+2} \leq N_{n+1}/P_{n+2} \qquad \text{Formula 3:}$$

According to another aspect of the present disclosure, the electrode assembly may include n+1 or more electrode units having different lengths, and the ratio of $dN_n$ to $dP_n$ ($dN_n/dP_n$) may not be greater than the ratio of $dN_n$ to $dP_{n+1}$ ($dN_n/dP_{n+1}$) where $dN_n$ denotes the thickness of an negative electrode of the nth longest electrode unit, $dP_n$ denotes the thickness of a positive electrode of the nth longest electrode unit, and $dP_{n+1}$ denotes the thickness of a positive electrode of the (n+1)th longest electrode unit. In other words, the electrode assembly may satisfy Formula 4.

$$dN_n/dP_n \leq dN_N/dP_{n+1} \qquad \text{Formula 4:}$$

If the electrode assembly includes three or more kinds of electrode units having different lengths, the ratio of $dN_n$ to $dP_{n+1}$ ($dN_n/dP_{n+1}$) may not be smaller than the ratio of $dN_n$ to $dP_n$ ($dN_n/dP_n$) and may not be greater than the ratio of $dN_{n+1}$ to $dP_{n+1}$ ($dN_{n+1}/dP_{n+1}$) where $dN_n$ denotes the thickness of a negative electrode of the nth longest electrode unit, $dP_n$ denotes the thickness of a positive electrode of the nth longest electrode unit, $dN_{n+1}$ denotes the thickness of a negative electrode of the (n+1)th longest electrode unit, $dP_{n+1}$ denotes the thickness of a positive electrode of the (n+1)th longest electrode unit, and $dP_{n+2}$ denotes the thickness of a positive electrode of the (n+2)th longest electrode unit. In addition, the ratio of $dN_{n+1}$ to $dP_{n+1}$ ($dN_{n+1}/dP_{n+1}$) may not be greater than the ratio of $dN_{n+1}$ to $dP_{n+2}$ ($dN_{n+1}/dP_{n+2}$). In other words, the electrode assembly may satisfy Formula 5.

$$dN_n/dP_n \leq dN_n/dP_{n+1} \leq dN_{n+1}/dP_{n+1} \leq dN_{n+1}/dP_{n+2} \qquad \text{Formula 5:}$$

If the electrode assembly including three or more kinds of electrode units having different lengths is formed in such a manner that the (n+2)th longest electrode unit is disposed between the nth longest electrode unit and the (n+1)th longest electrode unit, the ratio of $dN_{n+1}$ to $dP_{n+2}$ ($dN_{n+1}/dP_{n+2}$) may not be smaller than the ratio of $dN_n$ to $dP_{n+2}$ ($dN_n/dP_{n+2}$). In other words, the electrode assembly may satisfy Formula 6.

$$dN_n/dP_{n+2} \leq dN_{n+1}/dP_{n+2} \qquad \text{Formula 6:}$$

Preferably, positive and negative electrodes, mutually-facing at an interface between the electrode units of the electrode assembly, may have a ratio of negative electrode thickness to positive electrode thickness in the range of about 0.5 to about 2, about 0.6 to about 1.9, about 0.8 to about 1.5, or about 1.0 to about 1.5, or the ratio may be 1.0, 1.1, 1.2, 1.3, or 1.4.

The ratio of the reversible capacity per unit area of a negative electrode to the reversible capacity per unit area of a positive electrode facing the negative electrode at an interface between electrode units having different lengths of the electrode assembly may be about 1 or greater. For example, the ratio may range from about 1 to about 2, from about 1 to about 1.5, from about 1 to about 1.1, from about 1 to about 1.09, from about 1.5 to about 2, from about 1.02 to about 1.09, or from about 1.05 to about 1.09. Specifically, the ratio may be 1.05, 1.06, 1.07, 1.08, or 1.09.

If the electrode assembly includes three or more kinds of electrode units having different lengths, the ratio of reversible capacity per unit area of a negative electrode to reversible capacity per unit area of a positive electrode facing the negative electrode at an interface between the electrode units may be 1 or may be increased as the contact areas between the electrode units are decreased.

The electrode units may include at least one selected from the group consisting of a single electrode; at least one unit cell including at least one positive electrode, at least one negative electrode, and at least one separator; and a combination thereof. The unit cell may be formed as a type selected from the group consisting of a jelly-roll type, a stacked type, a laminated and stacked type, and a stacked and folded type. Electrodes disposed on both the outermost sides of the unit cell may have the same polarity or different polarities.

Electrodes and unit cells of the electrode units may be partially or entirely surrounded by at least one long sheet of separation film.

The electrode units may have various cross-sectional shapes such as a tetragon, a tetragon having at least one curved corner, a rhombus, or a shape having at least one curved side.

The electrode units of the electrode assembly may have different cross-sectional shapes or the same sectional shape.

The electrode units may include one or more electrode tabs, and electrode tabs of the same polarity may be electrically connected to each other. The electrode tabs may have the same size or different sizes according to the areas of the electrode units.

In the electrode assembly, the two or more electrode units having the same width and different lengths may be stacked in various manners. Methods of stacking the electrode units are not limited. For example, the electrode units may be sequentially stacked in a direction from the lower side to the upper side of the electrode assembly in reverse order of length or in order of length, or the electrode units may be stacked in such a manner that the longest electrode unit is disposed in the middle of the electrode assembly.

In the electrode assembly, the electrode units may be stacked in such a manner that planar center points of the electrode units are aligned with each other or are arranged with predetermined intervals therebetween. Alternatively, the electrode units may be arranged in such a manner that widthwise sides of the electrode units are aligned with each other.

According to another aspect of the present disclosure, a battery cell may include the electrode assembly and a battery case accommodating the electrode assembly. The battery case may be a pouch type battery case. However, the battery case is not limited thereto. The battery case may have a shape corresponding to the shape of the electrode assembly. The battery cell may be a lithium ion secondary battery or a lithium ion polymer secondary battery.

According to another aspect of the present disclosure, a device may include at least one such battery cell as described above. The device may be a cellular phone, a portable computer, a smartphone, a smartpad, a net book, an LEV (light electronic vehicle), an electric vehicle, a hybrid electric vehicle, a plug-in hybrid electric vehicle, or a power storage device.

According to the aspects of the present disclosure, a system component of the device may be disposed in a remaining space of the battery cell.

According to the present disclosure, since the electrode assembly includes two or more kinds of electrode units having different lengths, the electrode assembly may be variously designed and may have commercially required levels of electrical capacity and durability.

In addition, since positive and negative electrodes facing one another at interfaces of the electrode units having different lengths are balanced, the areas and thicknesses of the electrode units forming layers of the electrode assembly may be relatively freely adjusted while maintaining capacity and durability characteristics of the electrode assembly, and thus the degree of design freedom of the electrode assembly may be improved. Therefore, a device using the electrode assembly may have reduced dead space and high spatial efficiency as design freedom of the electrode assembly is high.

DETAILED DESCRIPTION OF THE PREFERRED EMBODIMENTS

Figure 1:
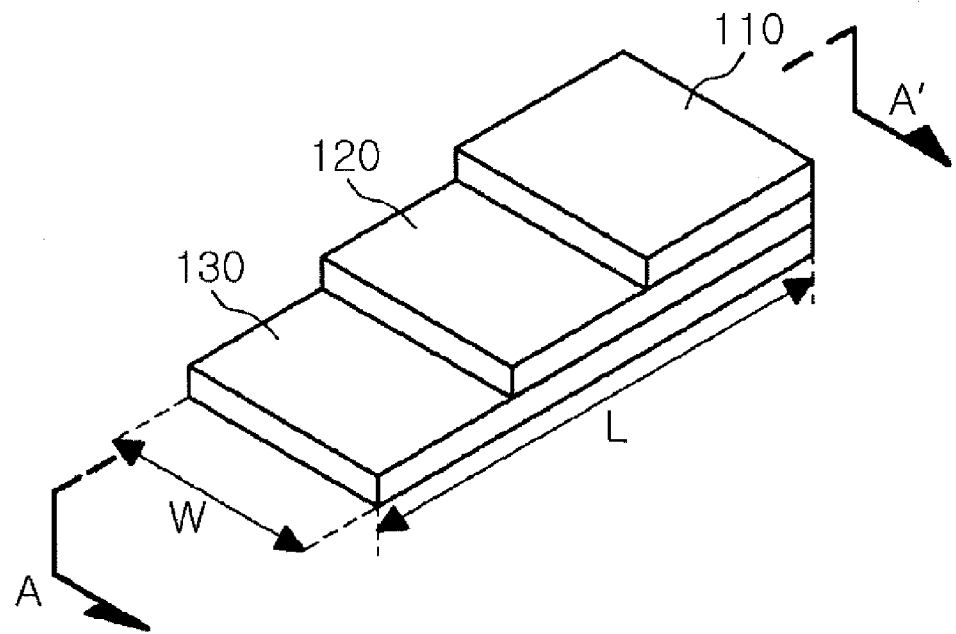
FIG. 1 is a perspective view illustrating an electrode assembly according to an exemplary embodiment of the present disclosure.

Hereinafter, embodiments of the present disclosure will be described in detail with reference to the accompanying drawings. The drawings are attached hereto to help explain exemplary embodiments of the present disclosure, and the embodiments of the present disclosure are not limited to the drawings. In the drawings, like reference numerals denote like elements, and some elements may be exaggerated, reduced in size, or omitted for clarity or conciseness.

FIG. 1 illustrates an electrode assembly according to an exemplary embodiment of the present disclosure. Referring to FIG. 1, the electrode assembly of the current embodiment includes two or more kinds of electrode units 110, 120, and 130 having the same width (W) and different lengths (L). The electrode units 110, 120, and 130 are stacked in such a manner that stepped portions are formed therebetween and electrodes having different polarities face each other at interfaces therebetween.

In the present disclosure, the term 'width (W)' refers to the length of each of two relatively short sides of the largest one of electrode units of an electrode assembly having four sides with two pairs of identical opposite sides. The term 'length (L)' refers to the length of each of two sides of an electrode unit other than the width sides of the electrode unit.

In addition, the term 'electrode unit' refers to a basic unit constituting a layer of an electrode assembly having stepped portions, and each electrode unit may include: a single electrode such as a negative electrode or a positive electrode; at least one unit cell including at least one negative electrode, at least one positive electrode, and at least one separator; or a combination thereof.

In addition, 'unit cell' is a term including an electrode stack having at least one negative electrode, at least one positive electrode, and at least one separator, and a method of stacking a negative electrode, a positive electrode, and a separator to form an electrode stack is not limited. In the present disclosure, for example, the term 'unit cell' may refer to an electrode stack such as: a jelly-roll type electrode stack manufactured by separating a sheet-type negative electrode and a sheet-type positive electrode with a separator film and winding the electrodes in a spiral shape; a stacked type electrode stack manufactured by sequentially stacking at least one negative electrode, at least one separator, and at least one positive electrode; or a stacked and folded type electrode stack manufactured by placing electrode stacks, respectively including a single electrode and/or at least one positive electrode, at least one separator, and at least one negative electrode, on a long sheet-type separation film, and folding the separation film.

In the present disclosure, a sacked type electrode stack may be manufactured through a conventional method by sequentially stacking a positive electrode, a separator, and a negative electrode, or may be may be manufactured by forming laminations (electrode basic units) respectively including at least one positive electrode, at least one negative electrode, and at least one separator, and stacking the electrode basic units (this method will now be referred to as a laminated and stacked type electrode stack or a lamination and stacking method).

In a laminated and stacked type electrode stack, the structure of each electrode basic unit is not limited as long as the electrode basic unit includes at least one positive electrode, at least one negative, and at least one separator.

However, in terms of process simplicity and economical aspects, electrode basic units of a laminated and stacked type electrode stack may have a basic structure of first electrode/separator/second electrode/separator or separator/first electrode/separator/second electrode. The first and second electrodes may have different polarities (for example, the first and second electrodes may be a positive electrode and a negative electrode), and the laminated and stacked type electrode stack may have one or more basic structures.

Furthermore, the laminated and stacked type electrode stack may only include electrode basic units having the above-mentioned basic structure or may include electrode basic units having the above-mentioned basic structure and an electrode structure having a different structure.

Figure 15:
FIGS. 15 to 17 are views illustrating examples of laminated and stacked type unit cells.
Figure 16:
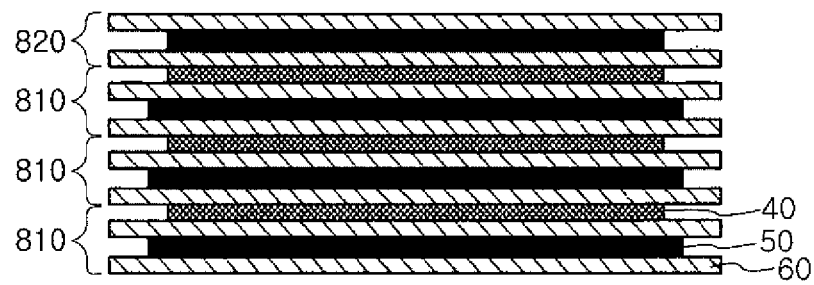
Figure 17:
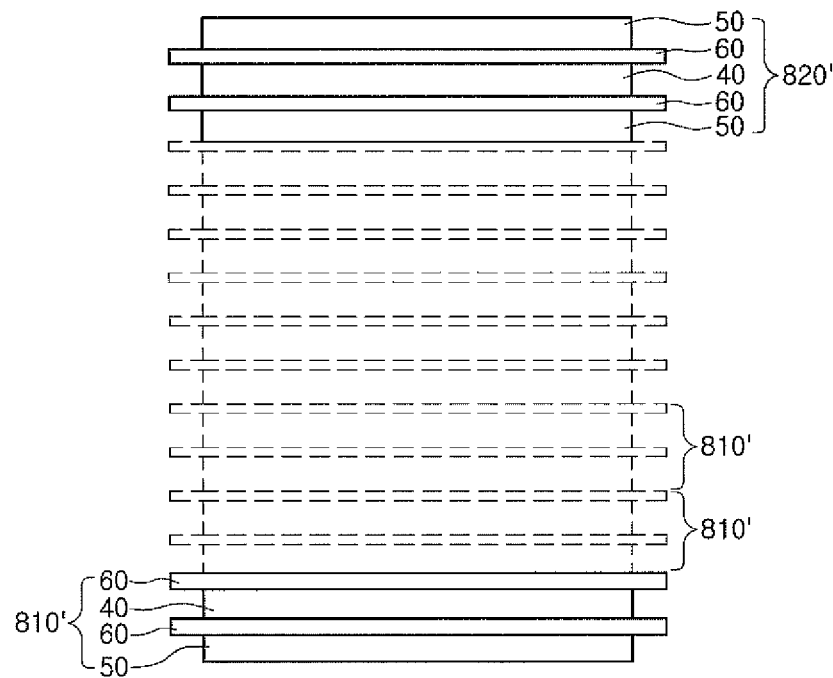

FIGS. 15 to 17 illustrate various examples of electrode stacks formed by a lamination and stacking method.

FIG. 15 illustrates a laminated and stacked type electrode stack including electrode basic units 710 having a basic structure of separator 60/negative electrode 50/separator 60/positive electrode 40. In FIG. 15, a basic structure of separator/negative electrode/separator/positive electrode is illustrated. However, a basic structure of separator/positive electrode/separator/negative electrode may be used. If the basic structure of an electrode basic unit is a separator/negative electrode/separator/positive electrode structure as illustrated in FIG. 15, the outermost (uppermost) positive electrode of the electrode stack formed of such electrode units may not be covered with a separator but may be exposed to the outside. In this case, the outermost positive electrode may be a single-side-coated positive electrode whose exposed side is not coated with an active material so as to optimize the capacity of a battery. In FIG. 15, the electrode basic units 710 have the same basic structure. However, the embodiments of the present disclosure are not limited thereto. For example, the electrode basic units may have two or more basic structures that are repeatedly stacked.

FIG. 16 illustrates an electrode stack including electrode basic units 810 having a basic structure of separator 60/negative electrode 50/separator 60/positive electrode 40 and an electrode structure having a structure of separator 60/negative electrode 50/separator 60. As shown in FIG. 16, since the outermost (uppermost) electrode structure has a structure of separator 60/negative electrode 40/separator 50, a positive electrode may not be exposed and thus the capacity of a battery may be increased. In the case of an electrode basic unit having an exposed uppermost negative electrode, an electrode structure having a structure of separator/positive electrode/separator may be disposed on the exposed uppermost negative electrode to maximally use the capacity of the uppermost negative electrode.

FIG. 17 illustrates an electrode stack including electrode basic units 810' having a basic structure of negative electrode 50/separator 60/positive electrode 40/separator 60 and an electrode structure 820' having a structure of negative electrode 50/separator 60/positive electrode 40/separator 60/negative electrode 50. In FIG. 17, since the outermost (uppermost) electrode structure 820' has a basic structure of negative electrode 50/separator 60/positive electrode 40/separator 60/positive electrode 50, a positive electrode may not be exposed, and thus the capacity of a battery may be increased.

As illustrated in FIGS. 16 and 17, electrode stacks formed by a lamination and stacking method may include electrode basic units having the above-described basic structures. In addition to the electrode basic units, the electrode stacks may further include a single electrode, a single separator, or a combination of unit cells having different arrangements and structures. For example, after stacking electrode basic units having the above-described basic structures, a single electrode, a single-side-coated electrode, a separator, or a unit cell having a different arrangement and structure may be disposed on an outermost side or each of both the outermost sides of the stacked electrode units so as to cover an exposed positive electrode and increase the capacity of a battery. In each of FIGS. 16 and 17, an electrode structure having a different structure is disposed on an upper side of an electrode stack. However, the embodiments of the present disclosure are not limited thereto. For example, an electrode structure having a different structure may be disposed in a lower side of an electrode stack, or electrode structures having a different structure(s) may be disposed on upper and loser sides of an electrode stack.

In the embodiments of the present disclosure, unit cells may have a structure such as a positive electrode/separator/negative electrode/separator/positive electrode structure or a negative electrode/separator/positive electrode/separator/negative electrode structure so that electrodes having the same polarity may be disposed on both the outermost sides (uppermost and lowermost sides) of the unit cells, or unit cells may have a basic structure such as a positive electrode/separator/negative electrode structure or a positive electrode/separator/negative electrode/separator/positive electrode/separator/negative electrode separator so that electrodes having different polarities may be disposed on both the outermost sides of the electrode units.

In the embodiments of the present disclosure, the term 'stacking and folding method (stacked and folded type)' refers to a method of placing a single electrode and/or electrode stacks respectively including at least one positive electrode, at least one separator, and at least one negative electrode on a long sheet of separation film, and folding the separation film. Here, the separation film may be folded by any method. Examples of folding methods include well-known folding methods such as a method of folding a sheet of separation film (known as a Z-folding or folding screen method), a method of folding a sheet of separation film on which electrode stacks respectively including at least one negative electrode, at least one positive electrode, and at least one separator therebetween is disposed, or a method of alternately arranging single electrodes on both sides of a sheet of separation film and folding the separation film. In the present disclosure, unit cells manufactured by a jelly-roll method, unit cells manufactured by a stacking method, unit cells manufactured by a stacking and folding method are referred to as jelly-roll type unit cells, stacked type unit cells, and stacked and folded type unit cells, respectively.

The embodiments of the present disclosure provide electrode assemblies each formed by stacking two or more kinds of electrode units having the same width (W) and different lengths (L) to form a stepped portion on the electrode assembly, and thus batteries having various shapes as compared to those of the related art may be manufactured using the electrode assemblies. In the embodiments of the present disclosure, the lengths (L) of electrode units are not limited as long as a stepped portion is formed when the electrode units are stacked. That is, the lengths (L) of electrode units may be freely selected according to the designs of batteries. For example, in an embodiment of the present disclosure, if the length (L) of the longer of two electrode units is 100%, the length (L) of the shorter of the two electrode units may range from 20% to 95%, preferably, from 30% to 90%.

In the embodiments of the present disclosure, electrode units of an electrode assembly may have the same thickness or different thicknesses. That is, the thicknesses of electrode units are not limited. For example, in an embodiment of the present disclosure, an electrode unit having a relatively long length (L) may be thinner or thicker than an electrode unit having a relatively short length (L).

In the embodiments of the present disclosure, electrodes having different polarities face each other at interfaces between electrode units having different lengths (L) so that electricity may be stored in the interfaces to increase the electrical capacity of a battery. The expression 'face each other' is used to denote a mutually-facing arrangement of electrodes, including a state in which two electrodes make contact with each other and other states in which another element such as a separator and/or a sheet of separation film is disposed between two electrodes facing each other.

According to an embodiment of the present disclosure, in an electrode assembly including two or more kinds of electrode units having the same width (W) and different lengths (L), a negative electrode of a relatively long electrode unit may face a positive electrode of a relatively short electrode unit at the interface between two electrode units. If electrode units having different lengths (L) are arranged in such a manner that a positive electrode of a relatively long electrode unit is disposed at an interface between the electrode units, lithium may precipitate from the positive electrode to decrease the lifespan or stability of a battery.

In the embodiments of the present disclosure, electrode assemblies include electrode units having different lengths, and if necessary, the electrode units may have different thicknesses. Therefore, various battery designs may be provided. However, if electrode assemblies are manufactured by only stacking electrode units having different lengths, the electrode assemblies may not have commercially required levels of capacity and durability, and since the thicknesses of the electrode units are limited to the multiples of the thicknesses of unit cells or unit electrodes, a degree of design freedom in a thickness direction may be limited. Thus, the inventors have carried out a great deal of research into ways of manufacturing electrode assemblies having markedly improved degrees of design freedom, particularly, improved degrees of design freedom in the thickness direction thereof, and commercially required levels of output efficiency and structural stability. As a result, the inventors found that electrode assemblies having improved capacity, durability, and degrees of freedom in the thickness direction thereof could be manufactured by adjusting the balance at interfaces between electrode units having different lengths.

The expression 'adjusting the balance at interfaces between electrode units having different lengths' refers to optimally designing mutually-facing positive and negative electrodes at the interfaces between the electrode units to obtain stable output efficiency and maintain the stability of a battery during a predetermined number of cycles. For example, this may be accomplished by adjusting the capacities or thicknesses of interfacial positive and negative electrodes. In more detail, according to the embodiments of the present disclosure, positive and negative electrodes facing each other at interfaces between electrode units having different lengths may be designed so that after 500 charging and discharging cycles at 25° C., an electrode assembly including the electrode units may have 60% or more of the electrical capacity measured after one charging and discharging cycle, and the overall thickness of the electrode assembly is varied by 15% or less as compared with an overall thickness measured after one charging and discharging cycle.

In the above, the electrical capacity is measured under the following charging condition (A) and discharging condition (B). In addition, an interval between charging and discharging is 10 minutes.

Charging condition (A): charging to a voltage of 4.25V or 4.35 V at a 1C rate in constant current mode, and then charging in constant voltage mode until a charging current reaches $\frac{1}{20}$ of minimum battery capacity.

Discharging condition (B): discharging to a voltage of 3 V at 1C rate in constant current mode The thickness variation of the electrode assembly is measured by the expression: (the overall thickness of the electrode assembly after 500 charging and discharging cycles/the overall thickness of the electrode assembly after one charging and discharging cycle)×100.

Through long-term research, the inventors have found that the interfaces between electrode units having different lengths can be balanced by adjusting the reversible capacities of negative and positive electrodes facing each other at the interfaces to certain conditions.

In detail, according to an embodiment of the present disclosure, an electrode assembly may be formed of electrode units in such a manner that a ratio of $N_n$ to $P_n$ ($N_n/P_n$) is not greater than a ratio of $N_n$ to $P_{n+1}$ ($N_n/P_{n+1}$) where $N_n$ denotes reversible capacity per unit area of an negative electrode of the nth longest electrode unit, $N_{n+1}$ denotes reversible capacity per unit area of a negative electrode of the (n+1)th longest electrode unit, $P_n$ denotes reversible capacity per unit area of a positive electrode of the nth longest electrode unit, and $P_{n+1}$ denotes reversible capacity per unit area of a positive electrode of the (n+1)th longest electrode unit. That is, the electrode assembly may satisfy Formula 1.

$$N_n/P_n \leq N_n/P_{n+1} \qquad \text{Formula 1:}$$

where n denotes an integer equal to or greater than 1.

In Formula 1, the reversible capacity per unit area of a negative electrode is defined as negative electrode charging capacity per unit area [mAh/cm$^2$]×negative electrode efficiency [%], where the negative electrode charging capacity per unit area is defined as negative electrode active material loading amount per unit area [g/cm$^2$]×negative electrode charging capacity per unit weight [mAh/g], and the negative electrode efficiency is defined as 100×the ratio of negative electrode discharging capacity to negative electrode charging capacity. In addition, the reversible capacity per unit area of a positive electrode is defined as: positive electrode active material loading amount [g/cm$^2$]×positive electrode charging capacity per unit weight [mAh/g]−the irreversible capacity per unit area of a negative electrode [mAh].

The negative electrode active material loading amount is the weight per unit area of a negative electrode active material coated on an negative electrode collector, and the positive electrode active material loading amount is the weight per unit area of a positive electrode active material coated on a positive electrode collector. In addition, the charging capacities per unit area of positive and negative electrodes, the discharging capacity, and the irreversible capacity may be measured as described below.

1) Charging Capacity Per Unit Weight of Positive Electrode

A positive-electrode half cell was manufactured, and a lithium electrode was prepared as an opponent electrode. Thereafter, the positive-electrode half cell was charged at a 0.1C rate to an electrode voltage of 4.25 V in constant current mode, and the electrical capacity of the positive-electrode half cell was measured. A value obtained by dividing the measured electrical capacity by the weight of an active material of the positive-electrode half cell was determined as the charging capacity per unit weight of a positive electrode.

2) Charging Capacity Per Unit Weight of Negative Electrode

A negative-electrode half cell was manufactured, and a lithium electrode was prepared as an opponent electrode. Thereafter, the negative-electrode half cell was charged at a 0.1C rate to an electrode voltage of 1.6V in constant current mode, and the electrical capacity of the negative-electrode half cell was measured. A value obtained by dividing the measured electrical capacity by the weight of an active material of the negative-electrode half cell was determined as the charging capacity per unit weight of a negative electrode.

3) Discharging Capacity Per Unit Weight of Negative Electrode

A negative-electrode half cell was manufactured, and a lithium electrode was prepared as an opponent electrode. Thereafter, the negative-electrode half cell was charged at a 0.1C rate to an electrode voltage of 1.6V in constant current mode, and was then discharged at a 0.1C rate to an electrode voltage of 0 V in constant current mode. Then, the electrical capacity of the negative-electrode half cell was measured. A value obtained by dividing the measured electrical capacity by the weight of an active material of the negative-electrode half cell was determined as the discharging capacity per unit weight of a negative electrode.

4) Irreversible Capacity Per Unit Weight of Negative Electrode

The difference between charging and discharging capacities of a negative electrode measured as described above was divided by the weight of an active material of a negative-electrode half cell was determined as the irreversible capacity per unit weight of the negative electrode.

According to research carried out by the inventors, although an electrode assembly including electrode units having different lengths is designed to properly operate the electrode units, if the capacity ratio of the electrode units at interfaces thereof do not satisfy Formula 1, the electrode assembly may not have commercially required levels of capacity and durability. This is a result not predicted for electrode assemblies formed of conventionally-sized electrode units. That is, when manufacturing electrode assemblies using electrode units having different lengths, additional factors not considered for electrode assemblies of the related art may be considered. In addition, if Formula 1 is satisfied, the thicknesses of electrode units may be freely selected within the range allowed by Formula 1, and thus the degree of design freedom in the thickness direction may be markedly improved.

According to an embodiment of the present disclosure, when economical aspects and energy density per volume are considered, it may be preferable that $N_n/P_n$ and $N_n/P_{n+1}$ of an electrode assembly be equal to or greater than about 1, more preferably, within the range of about 1 to about 1.2. However, the embodiments of the present disclosure are not limited thereto. In other words, according to other embodiments of the present disclosure, an electrode assembly may satisfy Formula 1-1, preferably Formula 1-2.

$$1 \leq N_n/P_n \leq N_n/P_{n+1} \quad \text{Formula 1-1:}$$

$$1 \leq N_n/P_n \leq N_n/P_{n+1} \leq 1.2 \quad \text{Formula 1-2:}$$

where n, $N_n$, $P_n$, and $P_{n+1}$ are the same as defined in Formula 1.

In an embodiment of the present disclosure, if the number of electrode units having different widths and included in an electrode assembly is n+2 or more (n is an integer equal to or greater than 1), a ratio of $N_n$ to $P_{n+1}$ ($N_n/P_{n+1}$) may not be smaller than a ratio of $N_n$ to $P_n$ ($N_n/P_n$) and may not be greater than a ratio of $N_{n+1}$ to $P_{n+1}$ ($N_{n+1}/P_{n+1}$), where $N_n$ denotes reversible capacity per unit area of a negative electrode of the nth longest electrode unit, $P_n$ denotes reversible capacity per unit area of a positive electrode of the nth longest electrode unit, $N_{n+1}$ denotes reversible capacity per unit area of an negative electrode of the (n+1)th longest electrode unit, $P_{n+1}$ denotes reversible capacity per unit area of a positive electrode of the (n+1)th longest electrode unit, and $P_{n+2}$ denotes reversible capacity per unit area of a positive electrode of the (n+2)th longest electrode unit. In addition, the ratio of $N_{n+1}$ to $P_{n+1}$ ($N_{n+1}/P_{n+1}$) may not be greater than the ratio of $N_{n+1}$ to $P_{n+2}$ ($N_{n+1}/P_{n+2}$) In other words, if an electrode assembly of the embodiment of the present disclosure includes a combination of three or more kinds of electrode units having different lengths, the electrode assembly may satisfy Formula 2.

$$N_n/P_n \leq N_n/P_{n+1} \leq N_{n+1}/P_{n+1} \leq N_{n+1}/P_{n+2} \quad \text{Formula 2:}$$

where n denotes an integer equal to or greater than

In the embodiment of the present disclosure, when economical aspects and energy density per volume are considered, it may be preferable that $N_n/P_n$, $N_n/P_{n+1}$, $N_{n+1}/P_{n+1}$, and $N_{n+1}/P_{n+2}$ of the electrode assembly be equal to or greater than about 1, more preferably, within the range of about 1 to about 1.2. That is, the electrode assembly of the embodiment of the present disclosure may satisfy Formula 2-1.

$$1 \leq N_n/P_n \leq N_n/P_{n+1} \leq N_{n+1}/P_{n+1} \leq N_{n+1}/P_{n+2} \quad \text{Formula 2-1:}$$

$$1 \leq N_n/P_n \leq N_n/P_{n+1} \leq N_{n+1}/P_{n+1} \leq N_{n+1}/P_{n+2} \leq 1.2 \quad \text{Formula 2-1:}$$

where n, $N_n$, $N_{n+1}$, $P_n$, and $P_{n+1}$ are the same as defined in the above description.

In the embodiment of the present disclosure, if the electrode assembly including n+2 or more electrode units having different lengths is formed in such a manner that the (n+2)th longest electrode unit is disposed between the nth longest electrode unit and the (n+1)th longest electrode unit, the ratio of $N_{n+1}$ to $P_{n+2}$ ($N_{n+1}/P_{n+2}$) may not be smaller than the ratio of $N_n$ to $P_{n+2}$ ($N_n/P_{n+2}$). In other words, if the electrode assembly of the embodiment of the present disclosure includes a combination of three or more kinds of electrode units having different lengths, the electrode assembly may satisfy Formulas 2 above and Formula 3.

$$N_n/P_{n+2} \leq N_{n+1}/P_{n+2} \quad \text{Formula 3:}$$

where n denotes an integer equal to or greater than 1, $N_n$ denotes reversible capacity per unit area of an negative electrode of the nth longest electrode unit, $N_{n+1}$ denotes reversible capacity per unit area of a negative electrode of (n+1)th longest electrode unit, $P_{n+1}$ denotes reversible capacity per unit area of a positive electrode of the (n+1)th longest electrode unit, and $P_{n+2}$ denotes reversible capacity per unit area of a positive electrode of the (n+2)th longest electrode unit.

According to research carried out by the inventors, if the reversible capacities of the positive and negative electrodes of the electrode assembly satisfy the above-described conditions, the electrode assembly may have improved output efficiency and structural stability although the lengths and thicknesses of the electrode units are variously varied. For example, after 500 charging and discharging cycles at 25° C., the electrical capacity of the electrode assembly may be 60% or more of the electrical capacity measured after one charging and discharging cycle, and the overall thickness of the electrode assembly may be varied by 15% or less as compared with an overall thickness measured after one charging and discharging cycle.

The ratio of the reversible capacity per unit area of a negative electrode to the reversible capacity per unit area of a positive electrode facing the negative electrode at interfaces between electrode units having different lengths of the electrode assembly may be 1 or greater, preferably, 1 to 2, 1 to 1.5, 1 to 1.1, 1 to 1.09, 1.5 to 2, 1.02 to 1.09, 1.05 to 1.09, 1.05, 1.06, 1.07, 1.08, or 1.09. According to research carried out by the inventors, although the areas or thicknesses of the electrode units are varied relatively freely if the ratio of the reversible capacity per unit area of a negative electrode to the reversible capacity per unit area of a positive electrode facing the negative electrode at the interfaces between the electrode units is 1 or greater, commercially required levels of battery capacity and durability may be obtained. However, if the ratio of the reversible capacities per unit area of the negative and positive electrodes is below 1, the stability and efficiency of a battery may be markedly reduced due to swelling.

In the embodiment of the present disclosure, if the electrode assembly includes a combination of three or more kinds of electrode units having different lengths, the ratio of the reversible capacity per unit area of a negative electrode to the reversible capacity per unit area of a positive electrode may be equal at the interfaces between the electrode units or may be increased in reverse proportion to the contact area between the electrode units. For example, if the electrode assembly includes three electrode units having different lengths (referred to as first to third electrode units from the longest one to the shortest one), the reversible capacity per unit area ratio of negative and positive electrodes disposed at the interface between the second and third electrode units may be equal to or greater than the reversible capacity per unit area ratio of negative and positive electrodes disposed at the interface between the first and second electrode units. As the number of electrode units having different lengths is increased, the number of interfaces between the electrode units may be increased to two or more, and if the two or more interfaces are not balanced, the stability and performance of a battery may be lowered due to structural deformation. According to research conducted by the inventors, when an electrode assembly is formed by combining three or more kinds of electrode units having different lengths, if the reversible capacity per unit area ratio of negative and positive electrodes at the interfaces between the electrode units is within the above-mentioned range, deterioration of the stability and performance of a battery caused by structural deformation may be minimized.

As another method of balancing negative and positive electrodes at the interfaces between electrode units having different lengths, the thickness ratio of the negative and positive electrodes may be adjusted to be within a predetermined range. For example, in the electrode assembly of the present disclosure, the thickness ratio of negative and positive electrodes (negative electrode thickness/positive electrode thickness) facing each other at the interfaces between the electrode units having different lengths may be adjusted to be within the range of about 0.5 to about 2, preferably, about 0.7 to about 1.8, more preferably, about 1.0 to about 1.4. If the thickness ratio of negative and positive electrodes facing each other at the interfaces between the electrode units is below 0.5, lithium ions may precipitate because the negative electrode is not sufficient to receive lithium ions from the positive electrode, and thus the performance and capacity of a battery may be lower than design-intended levels. If the thickness ratio of negative and positive electrodes facing each other at the interfaces between the electrode units is greater than 2, since negative electrode sites capable of receiving lithium ions during initial charging are increased, irreversible capacity may be increased, and actual capacity may be lower than designed capacity. In addition, since the negative electrode is excessively thick, the energy density of a battery (the ratio of efficiency/density of a battery) may be lowered, and a negative electrode active material may be separated due to low coating strength.

The thicknesses of negative and positive electrodes of an electrode assembly may be measured by cutting the electrode assembly using an ion milling device (cross section polisher (CP)) and scanning a cross section of the electrode assembly using an SEM. Each of the thicknesses of the negative and positive electrodes includes the thickness of an electrode collector and the thickness of an electrode active material layer. For example, the thickness of an electrode including a collector and an active material layer formed on one side of the collector is the sum of the thickness of the collector and the thickness of the active material layer, and the thickness of an electrode including a collector and active material layers formed on both sides of the collector (that is, an electrode having a structure of active material layer/collector/active material layer) is the sum of the thickness of the collector and the thicknesses of the active material layers.

Specifically, in an electrode assembly according to an embodiment of the present disclosure, the ratio of $dN_n$ to $dP_n$ ($dN_n/dP_n$) may not be greater than the ratio of $dN_n$ to $dP_{n+1}$ ($dN_n/dP_{n+1}$) where $dN_n$ denotes the thickness of an negative electrode of the nth longest electrode unit, $dP_n$ denotes the thickness of a positive electrode of the nth longest electrode unit, and $dP_{n+1}$ denotes the thickness of a positive electrode of the (n+1)th longest electrode unit. In other words, the electrode assembly of the embodiment of the present disclosure may satisfy Formula 4.

$$dN_n/dP_n \leq dN_N/dP_{n+1} \qquad \text{Formula 4:}$$

where n denotes an integer equal to or greater than 1.

In the embodiment of the present disclosure, when economical aspects and energy density per unit volume are considered, $dN_n/dP_n$ and $dN_n/dP_{n+1}$ of the electrode assembly may range from about 0.5 to about 2, preferably, from about 0.6 to about 1.9, more preferably, from about 1.0 to about 1.5. That is, the electrode assembly of the embodiment of the present disclosure may satisfy Formula 4-1, Formula 4-2, or Formula 4-3.

$$0.5 \leq dN_n/dP_n \leq dN_N/dP_{n+1} \leq 2 \qquad \text{Formula 4-1:}$$

$$0.6 \leq dN_n/dP_n \leq dN_N/dP_{n+1} \leq 1.9 \qquad \text{Formula 4-2:}$$

$$1.0 \leq dN_n/dP_n \leq dN_N/dP_{n+1} \leq 1.5 \qquad \text{Formula 4-3:}$$

In Formulas 4-1, 4-2, and 4-3, $dN_n$, $dP_n$, and $dP_{n+1}$ are the same as defined in the above description.

In the embodiments of the present disclosure, when the electrode assembly includes n+2 or more electrode units having different lengths, the ratio of $dN_n$ to $dP_{n+1}$ ($dN_n/dP_{n+1}$) may not be smaller than the ratio of $dN_n$ to $dP_n$ ($dN_n/dP_n$) and may not be greater than the ratio of $dN_{n+1}$ to $dP_{n+1}$ ($dN_{n+1}/dP_{n+1}$) where $dN_n$ denotes the thickness of an negative electrode of the nth longest electrode unit, $dP_n$ denotes the thickness of a positive electrode of the nth longest electrode unit, $dN_{n+1}$ denotes the thickness of a negative electrode of the (n+1)th longest electrode unit, $dP_{n+1}$ denotes the thickness of a positive electrode of the (n+1)th longest electrode unit, and $dP_{n+2}$ denotes the thickness of a positive electrode of the (n+2)th longest electrode unit. In addition, the ratio of $dN_{n+1}$ to $dP_{n+1}$ ($dN_{n+1}/dP_{n+1}$) may not be greater than the ratio of $dN_{n+1}$ to $dP_{n+2}$ ($dN_{n+1}/dP_{n+2}$). In other words, if the electrode assembly of the embodiment of the present disclosure includes three or more kinds of electrode units having different lengths, the electrode assembly may satisfy Formula 5.

$$dN_n/dP_n \leq dN_n/dP_{n+1} \leq dN_{n+1}/dP_{n+1} \leq dN_{n+1}/dP_{n+2} \qquad \text{Formula 5:}$$

where n denotes an integer equal to or greater than 1.

In the embodiments of the present disclosure, when economical aspects and energy density per unit volume are considered, $dN_n/dP_n$, $dN_n/dP_{n+1}$, $dN_{n+1}/dP_{n+1}$, and $dN_{n+1}/dP_{n+2}$ of the electrode assembly may range from about 0.5 to about 2, preferably, from about 0.6 to about 1.9, more preferably, from about 1.0 to about 1.5. That is, the electrode assembly of the embodiment of the present disclosure may satisfy Formula 5-1, Formula 5-2, or Formula 5-3.

$$0.5 \leq dN_n/dP_n \leq dN_n/dP_{n+1} \leq dN_{n+1}/dP_{n+1} \leq dN_{n+1}/dP_{n+2} \leq 2 \qquad \text{Formula 5-1:}$$

$$0.6 \leq dN_n/dP_n \leq dN_n/dP_{n+1} \leq dN_{n+1}/dP_{n+1} \leq dN_{n+1}/dP_{n+2} \leq 1.5 \qquad \text{Formula 5-2:}$$

$$1.0 \leq dN_n/dP_n \leq dN_n/dP_{n+1} \leq dN_{n+1}/dP_{n+1} \leq dN_{n+1}/dP_{n+2} \leq 1.5 \qquad \text{Formula 5-3:}$$

In Formulas 5-1, 5-2, and 5-3, $dN_n$, $dN_{n+1}$, $dP_n$, and $dP_{n+1}$ are the same as defined in the description of Formula 5.

Furthermore, in the embodiments of the present disclosure, if the electrode assembly including three or more kinds of electrode units having different lengths is formed in such a manner that the (n+2)th longest electrode unit is disposed between the nth longest electrode unit and the (n+1)th longest electrode unit, the ratio of $dN_{n+1}$ to $dP_{n+2}$ ($dN_{n+1}/dP_{n+2}$) may not be smaller than the ratio of $dN_n$ to $dP_{n+2}$ $dN_n/dP_{n+2}$). That is, the electrode assembly of the embodiment of the present disclosure may satisfy Formula 5 above and Formula 6.

$$dN_n/dP_{n+2} \leq dN_{n+1}/dP_{n+2} \qquad \text{Formula 6:}$$

where n denotes an integer equal to or greater than 1, $dN_n$ denotes the thickness of an negative electrode of the nth longest electrode unit, $dN_{n+1}$ denotes the thickness of a negative electrode of (n+1)th longest electrode unit, $dP_{n+1}$ denotes the thickness of a positive electrode of the (n+1)th longest electrode unit, and $dP_{n+2}$ denotes the thickness of a positive electrode of the (n+2)th longest electrode unit.

The above-described method of adjusting the thicknesses of the negative and positive electrodes at the interfaces between the electrode units may be simple as compared with the method of adjusting reversible capacity per unit area ratios. However, according to specifications of electrodes, the balance between the electrodes may not be adjusted only by adjusting the thicknesses of the electrodes. In this case, the reversible capacity ratios of positive and negative electrodes at interfaces of electrode units may also be adjusted when designing an electrode assembly. However, in both cases in which specifications for electrodes of electrode units are identical and different, if the charging capacity of a negative electrode active material is about 1.5 times to about 3 times, preferably, about 1.8 times to 2.5 times the charging capacity of a positive electrode active material, the thicknesses of negative and positive electrodes at the interfaces between electrode units may be adjusted to be within the above-mentioned ranges for easily adjusting the balance between the interfaces.

In the embodiments of the present disclosure, the thicknesses, porosities, loading amounts of the positive electrodes and negative electrodes included in the electrode assembly are not limited as long as the interfaces of the electrode units are balanced.

For example, the thicknesses of positive and negative electrodes of the electrode assembly may be appropriately selected according to factors such as the kinds of electrode active materials and the capacity of a battery. For example, in the electrode assembly of the embodiment of the present disclosure, the thicknesses of positive electrodes may range from about 50 μm to about 150 μm, from about 80 μm to about 140 μm, or from about 100 μm to about 150 μm, and the thicknesses of negative electrodes may range from about 80 μm to about 200 μm, from about 100 μm to about 200 μm, or from about 100 μm to about 150 μm.

Furthermore, in the embodiments of the present disclosure, the coating amounts (loading amounts) of electrode active materials per unit area of positive and negative electrodes of the electrode assembly are not limited but may be appropriately selected according to factors such as the kinds of electrode active materials and the capacity of a battery. For example, in the embodiment of the present disclosure, the coating amount of a positive electrode active material per unit area of a positive electrode may range from about 10 mg/cm² to about 30 mg/cm², from about 10 mg/cm² to about 25 mg/cm², or from about 15 mg/cm² to about 30 mg/cm², and the coating amount of a negative electrode active material per unit area of a negative electrode may range from about 5 mg/cm² to about 20 mg/cm², from about 5 mg/cm² to about 15 mg/cm², or from about 10 mg/cm² to about 20 mg/cm².

In addition, the porosities of positive and negative electrodes are not limited thereto but may be appropriately selected according to electrode active materials and the capacity of a battery. For example, in the embodiment of the present disclosure, the porosity of a positive electrode may range from about 10% to about 30%, from about 15% to about 30%, or from about 10% to about 25%, and the porosity of a negative electrode may range from about 15% to about 50%, from about 20% to about 50%, or from about 15% to about 40%.

According to research carried out by the inventors, if the thicknesses of the positive and negative electrodes of the electrode assembly satisfy the above-described conditions, the electrode assembly may have improved output efficiency and structural stability although the lengths and thicknesses of the electrode units are variously varied. For example, after 500 charging and discharging cycles at 25° C., the electrical capacity of the electrode assembly may be 60% or more of the electrical capacity of the electrode assembly measured after one charging and discharging cycle, and the overall thickness of the electrode assembly may be varied by 15% or less as compared with the overall thickness of the electrode assembly measured after one charging and discharging cycle.

In the embodiments of the present disclosure, the electrode units of the electrode assembly may be variously combined. Hereinafter, configurations of electrode units will be described in more detail according to embodiments of the present disclosure with reference to the accompanying drawings. FIGS. 2 to 5 illustrate configurations of electrode units of electrode assemblies according to exemplary embodiments of the present disclosure.

Figure 2:
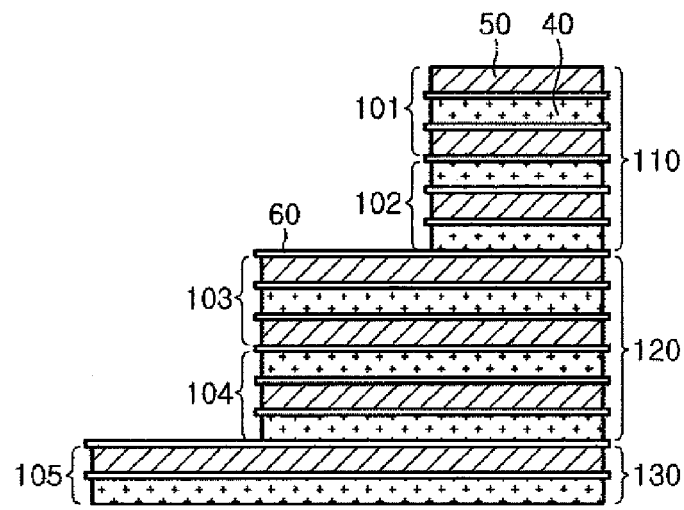
FIG. 2 is a side view illustrating an electrode assembly according to a first embodiment of the present disclosure.

FIG. 2 is a sectional view taken along line A-A' of FIG. 1, in which the electrode units 110, 120, and 130 of the electrode assembly are formed of stacked type unit cells according to an embodiment of the present disclosure. Referring to FIG. 2, the electrode assembly of the embodiment of the present disclosure may include the kinds of electrode units 110, 120, and 130 having different lengths (L), and the electrode units 110, 120, and 130 may include stacked type unit cells respectively including a positive electrode 40, a negative electrode 50, and a separator 60 disposed therebetween. For example, the electrode unit 130 may be formed of one unit cell 105, and the unit cell 110 or 120 may be formed of two unit cells 101 and 102 or 103 and 104 having the same width (W) and length (L). In FIG. 2, all the unit cells of the electrode units are stacked type unit cells. However, the embodiments of the present disclosure are not limited thereto. That is, in the embodiments of the present disclosure, an electrode unit may include a stacked type unit cell, a jelly-roll type unit cell, a stacked and folded type unit cell, a combination of such unit cells and single electrodes, or a combination of different kinds of unit cells.

Figure 3:
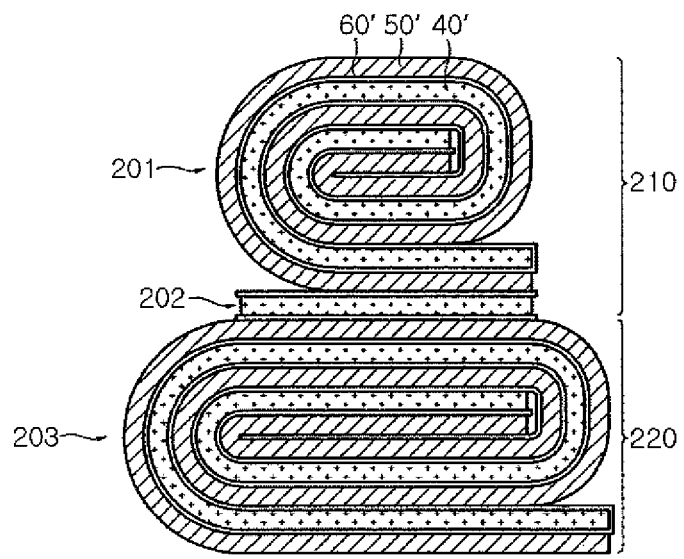
FIG. 3 is a side view illustrating an electrode assembly according to a second embodiment of the present disclosure.

For example, FIG. 3 is a cross-sectional view illustrating an electrode assembly including electrode units formed by combining jelly-roll type unit cells and a single electrode according to an embodiment of the present disclosure. Referring to FIG. 3, the electrode assembly of the current embodiment may two kinds of electrode units 210 and 220 having different lengths (L). The shorter electrode unit 210 may be formed by combining a jelly-roll type unit cell 201 and a single electrode 202, and the longer electrode unit 220 may be formed of a jelly-roll type unit cell 203. Each of the jelly-roll type unit cells 201 and 203 may be formed by winding a negative electrode sheet 50', a positive electrode sheet 40', and a separator 60' disposed therebetween. In this case, the negative electrode sheet 50' may be exposed to the outside for electric stability, and the single electrode 202 may be a positive electrode. However, the embodiments of the present disclosure are not limited thereto. For example, a positive electrode sheet of a jelly-roll type unit cell may be exposed to the outside, and a region of the positive electrode sheet exposed to the outside may not be coated with a positive electrode active material (that is, a non-coating portion of the positive electrode sheet may be exposed to the outside).

FIG. 3 illustrates an electrode unit formed of a combination of a jelly-roll type unit cell and a single electrode, and an electrode unit formed of a jelly-roll type unit cell. However, the embodiments of the present disclosure are not limited thereto. For example, an electrode unit may be formed by combining a stacked type unit cell and/or a stacked and folded type unit cell with a single electrode. In another example, an electrode unit may be formed by combining two or more kinds of unit cells.

Figure 4:
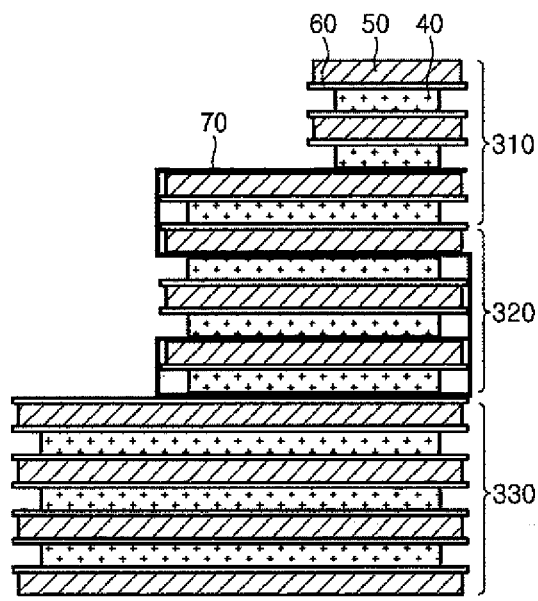
FIG. 4 is a side view illustrating an electrode assembly according to a third embodiment of the present disclosure.

For example, FIG. 4 illustrates an electrode assembly formed by combining stacked type unit cells and a stacked and folded type unit cell according to an embodiment of the present disclosure. Referring to FIG. 4, the electrode assembly of the embodiment may include three kinds of electrode units 310, 320, and 330 having different lengths (L). The shortest electrode unit 310 and the longest electrode unit 330 may be formed of stacked type unit cells, and the electrode unit 320 may be formed of a stacked and folded type unit cell. The stacked type unit cell of the shortest electrode unit 310 may have a structure of negative electrode 50/separator 60/positive electrode 40/separator 60/negative electrode 50/separator 60/positive electrode 40. The unit cell of the longest electrode unit 330 may have a structure of negative electrode 50/separator 60/positive electrode 40/separator 60/negative electrode 50/separator 60/positive electrode 40/separator 60/negative electrode 50. As described above, in the embodiment of the present disclosure, electrodes disposed on the outermost sides of a unit cell may have different polarities or the same polarity, and at least one positive electrode and/or at least one negative electrode may be included in a unit cell. The stacked and folded unit cell of the electrode unit 320 may include electrode stacks respectively including a negative electrode, a positive electrode, and a separator and disposed on a folded sheet of separation film 70.

Figure 5:
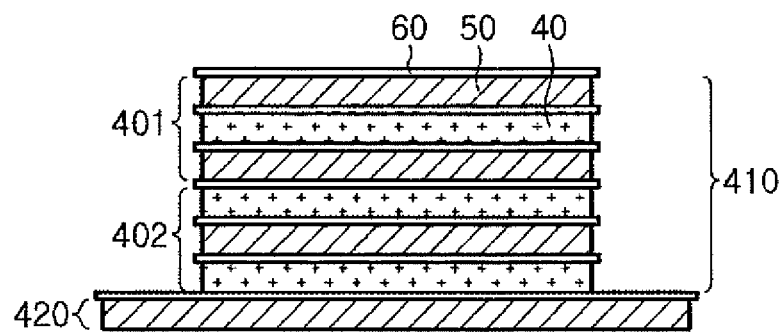
FIG. 5 is a side view illustrating an electrode assembly according to a fourth embodiment of the present disclosure.

FIG. 5 illustrates an electrode unit formed of a single electrode according to an embodiment of the present disclosure. Referring to FIG. 5, an electrode assembly includes: an electrode unit 420 formed of a single electrode; and an electrode unit 410 formed of one or more unit cells 401 and 402.

As described above, according to the embodiments of the present disclosure, an electrode unit of an electrode assembly may be formed of a single electrode, one or more unit cells, or a combination thereof. Various unit cells used in the related art such as a stacked type unit cell, a jelly-roll type unit cell, a stacked and folded type unit cell, and a combination thereof may be used as the unit cells without any limitation. In addition to the unit cells shown in FIGS. 2 to 5, various other types of unit cells may be used. That is, in other embodiments of the present disclosure, other types of unit cells may be used.

Figure 6:
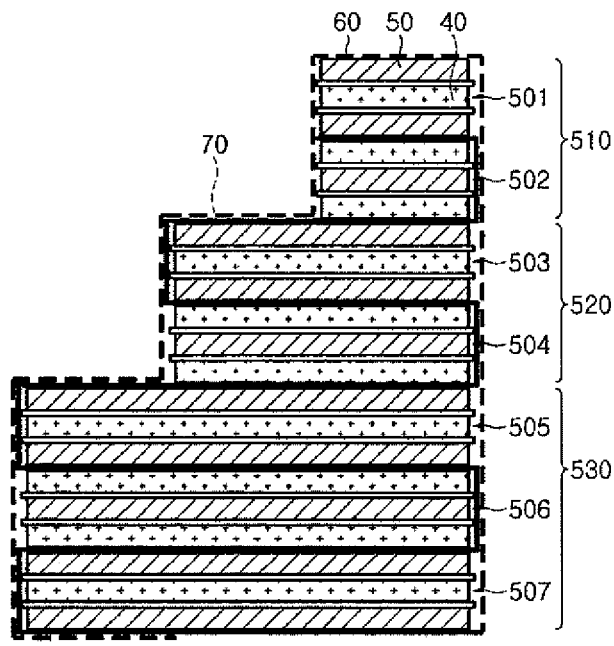
FIG. 6 is a side view illustrating an electrode assembly according to a fifth embodiment of the present disclosure.

Furthermore, according to other embodiments of the present disclosure, electrode units of an electrode assembly may be partially or entirely surround by at least one sheet of separating film. FIG. 6 illustrates an electrode assembly in which a single electrode and unit cells of electrode units are partially or entirely surrounded by a sheet of separation film according to an exemplary embodiment of the present disclosure. Referring to FIG. 6, unit cells 501, 502, 503, 504, 505, 506, and 507 of electrode units 510, 520, and 530 are surrounded by a sheet of separation film 70. In this case, expansion or swelling of a battery may be suppressed by the separation film 70 for improving the stability of the battery. In FIG. 6, portions of the separation film 70 indicated by a dashed line may be unnecessary portions.

In FIG. 6, the unit cells 501, 502, 503, 504, 505, 506, and 507 are surrounded by the separation film 70 in a zigzag manner. However, the embodiments of the present disclosure are not limited thereto. For example, a sheet of separation film may be wound around a single electrode and/or unit cells.

Figure 7:
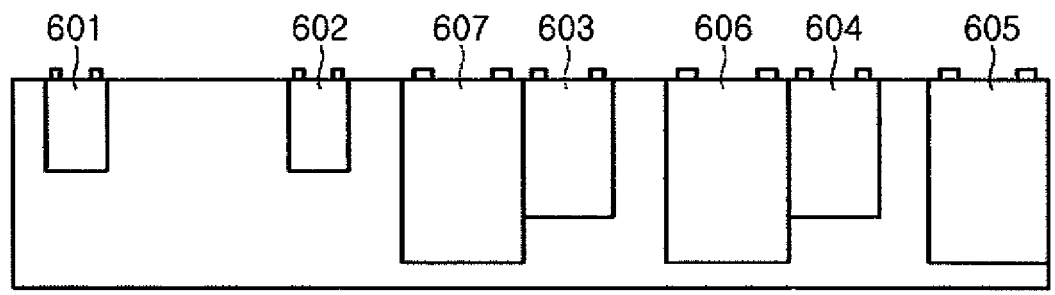
FIG. 7 is a developed view illustrating an electrode assembly according to an exemplary embodiment of the present disclosure.

As shown in FIG. 7, according to an embodiment of the present disclosure, unit cells 601, 602, 603, 604, 605, 606, and 607 having the same width (W) and different length (L) may be placed on a sheet of separation film 670, and the separation film 670 may be rolled to form an electrode assembly.

Although not shown in the drawings, positive electrodes may be arranged on a side of a sheet of separation film at predetermined intervals, and negative electrodes may arranged on the other side of the separation film. Then, the separation film may be rolled to form an electrode assembly. In another example, negative electrode may be arranged with predetermined intervals therebetween on a sheet of separation film, and positive electrode may be arranged with predetermined intervals therebetween on another sheet of separation film. Then, the two sheets of separation film may be rolled to form an electrode assembly. In addition to the above-described methods, electrode units may be partially or entirely surrounded by a separation film by other methods according to the shape of an electrode assembly to be formed. Such methods may also be within the scope of the embodiments of the present disclosure.

In the embodiments of the present disclosure, materials for positive electrodes, negative electrodes, and separators of an electrode assembly are not limited. For example, materials used for forming positive electrodes, negative electrodes, and separators in the related art may be used. For example, a negative electrode may be fabricated by making a negative electrode collector using copper, nickel, aluminum, or an alloy including at least one of copper, nickel, and aluminum, and coating the negative electrode collector with a negative electrode active material such as lithium, a lithium alloy, carbon, petroleum coke, active carbon, graphite, a silicon compound, a zinc compound, a titanium compound, or an alloy thereof. For example, a positive electrode may be fabricated by making a positive electrode collector using aluminum, nickel, copper, or an alloy including at least one of aluminum, nickel, and copper, and coating the positive electrode collector with a positive electrode active material such as a lithium manganese oxide, a lithium cobalt oxide, a lithium nickel oxide, a lithium iron phosphate, or a compound or mixture including at least one thereof. At this time, portions of positive and negative electrodes of the same unit cell coated with active materials may have the same area or different areas. For example, the negative and positive electrodes of each unit cell of FIG. 2 have the same active material coated area, and the negative and positive electrodes of each unit cell of FIG. 4 have different active material coated areas. An electrode active material may be coated on both sides of a collector or may be coated only on a side of a collector for forming a non-coated portion.

In addition, each of separators may be a multilayer film formed of a material having fine pores such as polyethylene, polypropylene, or a combination thereof. In another example, each of the separators may be a polymer film for a solid or gel-type polymer electrolyte, such as a polyvinylidene fluoride, a polyethylene oxide, a polyacrylonitrile, or a polyvinylidenefluoride-co-hexafluoropropylene film.

In an embodiment of the present disclosure, electrode units of an electrode assembly may include at least one electrode tab. For example, an electrode unit formed of a single electrode (for example, the electrode unit 420 of FIG. 5) may include a single electrode tab, and an electrode unit including a unit cell may include a negative electrode tab and a positive electrode tab. After electrode units are inserted in a battery case, electrode tabs of the same polarity may be electrically connected to each other. In the embodiments of the present disclosure, the areas or arrangement of electrode tabs are not limited. However, electrode tabs of electrode units may be formed on the same side of four sides of each electrode unit. For example, electrode tabs may be formed on widthwise or lengthwise ends of electrode units. If electrode tabs are formed on lengthwise ends of electrode units, the electrode tabs may be arranged within the length of the shortest electrode unit.

Furthermore, in the embodiments of the present disclosure, electrode tabs may be variously positioned on electrode units. For example, electrode tabs of the same polarity may be partially or entirely overlapped with each other. In the related art, generally, electrode tabs of the same polarity are entirely overlapped with each other so as to easily connect the electrode tabs after an electrode assembly is inserted into a battery case. However, the connected electrode tabs may have a large thickness if many electrodes are stacked. In this case, the electrode tabs may not be securely connected. This problem may be prevented if electrode tabs are partially overlapped.

Figure 8:
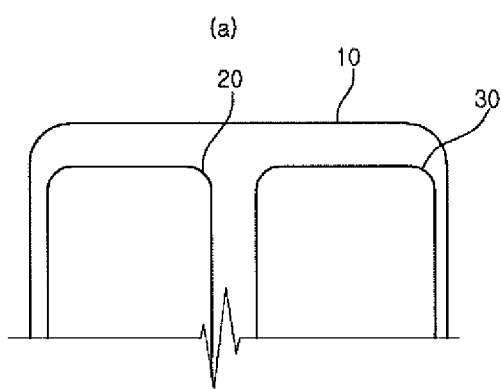
FIGS. 8A and 8B are views illustrating electrode tabs according to an exemplary embodiment of the present disclosure.
Figure 8:
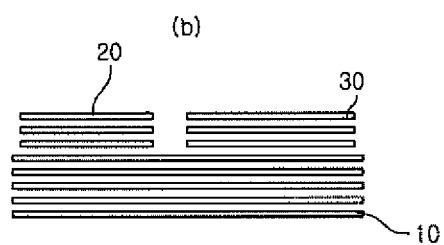

According to an embodiment of the present disclosure, electrode tabs having different areas may be partially overlapped with each other to improve bonding characteristics between the electrode tabs and maximize the electrical capacity of a battery. FIG. 8 illustrates exemplary electrode tabs of an electrode assembly according to an embodiment of the present disclosure. Referring to FIG. 8, the electrode assembly includes electrode tabs 10, 20, and 30 having different areas according to electrode units, and the electrode tabs 10, 20, and 30 may be arranged in an overlapping manner.

According to embodiments of the present disclosure, each electrode unit may include two identical sides and the other two identical sides. For example, according to embodiments of the present disclosure, electrode units may have a tetragonal shape such as a rectangle, a square, a parallelogram, and a rhombus. In addition, at least one corner of each electrode unit may be chamfered or rounded, and at least one side of each electrode unit may have a curved shape. In addition, electrode units having other various shapes may be used according to other embodiments of the present disclosure.

Figure 11:
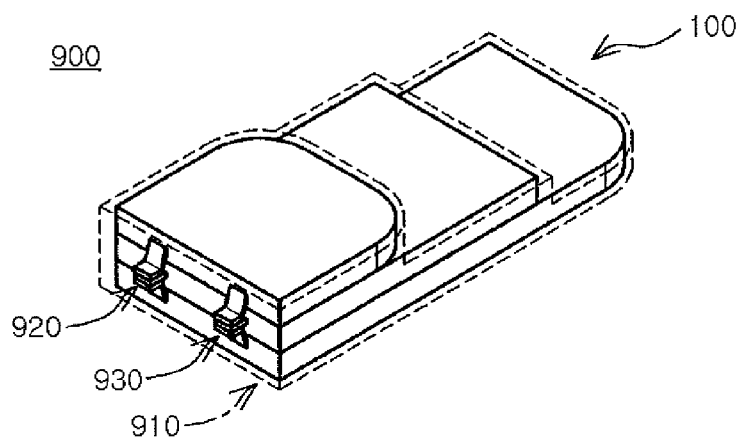
FIG. 11 is a perspective view illustrating a battery cell according to another exemplary embodiment of the present disclosure.

In the embodiments the present disclosure, an electrode assembly may include electrode units having the same shape or may include electrode units having different shapes as shown in FIG. 11. Batteries having various shapes may be provided by using electrode units having such various shapes, and spaces may be efficiently used if such batteries are used.

Figure 9:
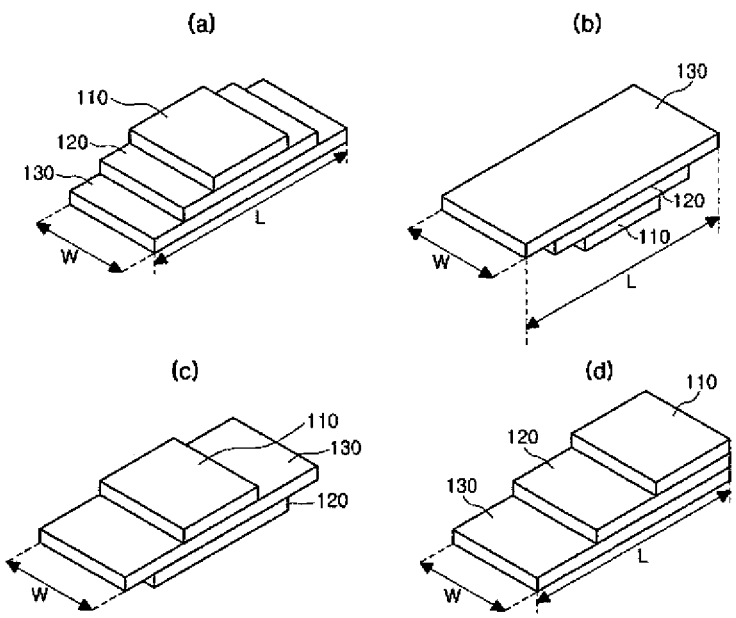
FIGS. 9A to 9D are views illustrating exemplary stacked structures of electrode units according to embodiments of the present disclosure.

According to embodiments of the present disclosure, as shown in FIGS. 9A to 9D, two or more electrode units having the same width (W) and different lengths (L) may be variously arranged to form electrode assemblies. Methods of stacking electrode units are not limited. For example, referring to FIG. 9A, electrode units of an electrode assembly are stacked in such a manner that the lengths of the electrode units decrease in a direction from the lower side to the topside of the electrode assembly. Referring to FIG. 9B, electrode units of an electrode assembly are stacked in such a manner that the lengths of the electrode units increase in a direction from the lower side to the topside of the electrode assembly. Referring to FIG. 9C, electrode units of an electrode assembly are stacked in such a manner that the longest electrode unit is disposed in a middle layer of the electrode assembly.

In the embodiment shown in FIG. 9A, the planar center points of the electrode units may be aligned with each other. In the embodiment shown in FIG. 9D, the planar center points of the electrode units may be arranged with predetermined intervals therebetween, and widthwise sides of the electrode units may be aligned with each other.

In addition, electrode units may be arranged in various manners according to other embodiments of the present disclosure.

Figure 10:
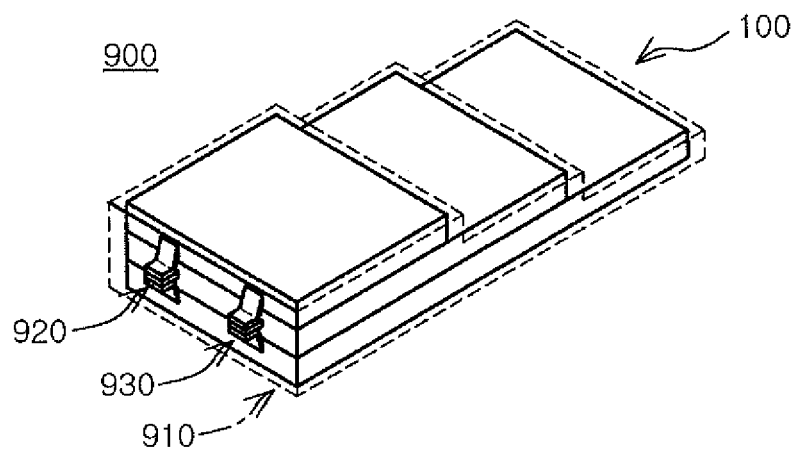
FIG. 10 is a perspective view illustrating a battery cell according to an exemplary embodiment of the present disclosure.

Next, battery cells will be described according to embodiments of the present disclosure. FIGS. 10 and 11 illustrate battery cells 900 according to embodiments of the present disclosure. Referring to FIGS. 10 and 11, each of the battery cells 900 are formed by disposing an electrode assembly 100 in a battery case 910.

The battery case 910 may be a pouch type case having a shape corresponding to the shape of the electrode assembly 100. However, the battery case 910 is not limited thereto.

The pouch type case may be formed of a laminate sheet including an outer resin layer, a blocking metal layer for preventing permeation of foreign substances, and an inner sealing resin layer. However, the pouch type case is not limited thereto.

Electrode leads 920 and 930 for connecting electrode terminals of electrode units of the electrode assembly 100 may be exposed on the outer surface of the battery case 910, and insulation films (not shown) may be attached to the top and bottom sides of the electrode leads 920 and 930 to protect the electrode leads 920 and 930.

The battery case 910 may have a shape corresponding to the shape of the electrode assembly 100. For example, the battery case 910 may be deformed into a shape corresponding to the shape of the electrode assembly 100. The battery case 910 may not have exactly the same shape and size as the shape and size of the electrode assembly 100. However, the battery case 910 may have a shape and size suitable for preventing sliding of the electrode assembly 100 and short circuiting of the electrode assembly 100. However, the shape and size of the battery case 910 are not limited thereto. That is, the shape and size of the battery case 910 may be varied according to, for example, application conditions.

The battery cells 900 may be lithium ion battery cells or lithium ion polymer battery cells. However, the battery cells 900 are not limited thereto.

According to embodiments of the present disclosure, battery cells may be individually used or may be used in the form of a battery pack including at least one battery cell. According to embodiments of the present disclosure, such a battery cell and/or a battery pack may be used in various devices such as cellular phones, portable computers, smartphones, smart-pads, net books, light electronic vehicles (LEVs), electric vehicles, hybrid electric vehicles, plug-in hybrid electric vehicles, or general power storage devices. Structures and construction methods of such devices are well known in the related art, and thus, descriptions thereof will be omitted.

When the battery cell or battery pack is placed in such a device, a system component of the device may be disposed in a space remaining owing to the structure of the battery cell or battery pack. According to the embodiments of the present disclosure, the battery cell or battery pack includes a stepped electrode assembly or stepped electrode assemblies having different sizes, and a battery case or battery cases of the battery cell or the battery pack are shaped according to the shape of the electrode assembly or electrode assemblies. Therefore, the space of a device using the battery cell or battery pack can be saved as compared with the case in which the device using a prismatic or elliptical battery cell or battery pack of the related art. A system component of the device may be disposed in the saved space. In this case, the system component and the battery cell or battery pack may flexibly be disposed in the device, and thus the space of the device can be efficiently used. Furthermore, the thickness or volume of the device can be reduced to make the device slim.

MODES FOR CARRYING OUT THE INVENTION

Hereinafter, examples of the present disclosure will be described. The following examples are for illustrative purposes only and are not intended to limit the scope of the embodiments of the present disclosure.

Manufacturing Example 1

Positive Electrode (A)

$LiCoO_2$ used as a positive electrode active material, and polyvinylidene fluoride (PVDF) used as a binder were mixed and dissolved in N-Methyl-2-Pyrrolidone (NMP) to prepare positive electrode paste. The positive electrode paste was applied to both sides of an aluminum foil collector and was dried in an oven at 150° C. Then, collector coated with the positive electrode paste was pressed to form a positive electrode (A). The positive electrode (A) had a thickness of 100 µm, a porosity of 21%, and reversible capacity of 335 mAh.

Manufacturing Example 2

Positive Electrode (B)

A positive electrode (B) was manufactured in the same manner as in Manufacturing Example 1 except that the positive electrode (B) had a thickness of 110 µm. The positive electrode (B) had a thickness of 110 µm, a porosity of 21%, and reversible capacity of 375 mAh.

Manufacturing Example 3

Negative Electrode (A)

A blend of Natural graphite and artificial graphite was used as a negative electrode active material, and Styrene-Butadiene Rubber (SBR) and Carboxymethyl Cellulose (CMC) were used as a binder. The negative electrode active material and the binder were mixed and dissolved in distilled water to prepare a negative electrode paste. The negative electrode paste was applied to both sides of a copper foil collector and was dried in an oven at 100° C. Then, collector coated with the negative electrode paste was pressed to form a negative electrode (A). The negative electrode (A) had a thickness of 105 µm, a porosity of 27%, and reversible capacity of 348 mAh.

Manufacturing Example 4

Negative Electrode (B)

A negative electrode (B) was manufactured in the same manner as in Manufacturing Example 3 except that the negative electrode (B) had a thickness of 108 µm. The negative electrode (B) had a thickness of 105 µm, a porosity of 27%, and reversible capacity of 359 mAh.

Manufacturing Example 5

Negative Electrode (C)

A negative electrode (C) was manufactured in the same manner as in Manufacturing Example 3 except that the negative electrode (C) had a thickness of 118.8 µm. The negative electrode (C) had a thickness of 118.8 µm, a porosity of 27%, and reversible capacity of 400 mAh.

Manufacturing Example 6

Negative Electrode (D)

A negative electrode (D) was manufactured in the same manner as in Manufacturing Example 3 except that the negative electrode (B) had a thickness of 90 µm. The negative electrode (D) had a thickness of 90 µm, a porosity of 27%, and reversible capacity of 294 mAh.

Manufacturing Example 7

Negative Electrode (E)

A negative electrode (E) was manufactured in the same manner as in Manufacturing Example 3 except that the negative electrode (E) had a thickness of 140 µm. The negative electrode (E) had a thickness of 140 µm, a porosity of 27%, and reversible capacity of 465 mAh.

Example 1

The positive electrode (A) and the negative electrode (A) were cut into 100 mm×150 mm, and were stacked with a separator being interposed therebetween to form an electrode unit. Then, a relatively small-area electrode unit was formed by cutting the positive electrode (A) and the negative electrode (A) to be 100 mm×120 mm and stacking the positive and negative electrodes (A) with a separator being interposed therebetween. The relatively large-area electrode unit and the relatively small-area electrode unit were stacked to form an electrode assembly.

Example 2

The positive electrode (A) and the negative electrode (A) were cut into 100 mm×150 mm, and were stacked with a separator being interposed therebetween to form an electrode unit. Then, a relatively small-area electrode unit was formed by cutting the positive electrode (A) and the negative electrode (B) to be 100 mm×120 mm and stacking the positive electrode (A) and the negative electrode (B) with a separator being interposed therebetween. The relatively large-area electrode unit and the relatively small-area electrode unit were stacked to form an electrode assembly.

Comparative Example 1

The positive electrode (A) and the negative electrode (B) were cut into 100 mm×150 mm, and were stacked with a separator being interposed therebetween to form an electrode unit. Then, a relatively small-area electrode unit was formed by cutting the positive electrode (B) and the negative electrode (C) to be 100 mm×120 mm and stacking the positive electrode (B) and the negative electrode (C) with a separator being interposed therebetween. The relatively large-area electrode unit and the relatively small-area electrode unit were stacked to form an electrode assembly.

Comparative Example 2

The positive electrode (A) and the negative electrode (D) were cut into 100 mm×150 mm, and were stacked with a separator being interposed therebetween to form an electrode unit. Then, a relatively small-area electrode unit was formed by cutting the positive electrode (A) and the negative electrode (A) to be 100 mm×120 mm and stacking the positive electrode (A) and the negative electrode (A) with a separator being interposed therebetween. The relatively large-area electrode unit and the relatively small-area electrode unit were stacked to form an electrode assembly.

In Tables 1 and 2 and Experimental Examples 1 and 3, the term 'large-area electrode unit' refers to an electrode unit having a relatively long length, and the term 'small-area electrode unit' refers to an electrode unit having a relatively short length.

TABLE 1

| | Large-area electrode units | | | Small-area electrode units | | | N/P thickness ratios at interfaces | N/P reversible capacity ratios at interfaces |
|---|---|---|---|---|---|---|---|---|
| No. | P | N | N/P thickness ratios | P | N | N/P thickness ratios | | |
| E 1 | A | A | 1.05 | A | A | 1.05 | 1.05 | 1.03 |
| E 2 | A | A | 1.05 | A | B | 1.08 | 1.05 | 1.03 |
| CE 1 | A | B | 1.08 | B | C | 1.08 | 0.98 | 0.957 |
| CE 2 | A | D | 0.90 | A | A | 1.05 | 0.90 | 0.878 |

E: Example,
CE: Comparative Example,
P: positive electrode,
N: negative electrode Experimental Example 1

Electric capacities and thickness variations of the electrode assemblies of Examples 1 and 2 and Comparative Examples 1 and 2 were measured after the electrode assemblies undergone 500 charging and discharging cycles.

The electric capacities were measured under the following charging condition and discharging condition, and charging and discharging were carried out at intervals of 10 minutes.

(1) Charging condition (A): charging to a voltage of 4.2 V or 4.35 V at 1C rate in constant current mode, and then charging in constant voltage mode until a charging current reaches 1/20 of minimum battery capacity (2) Discharging condition (B): discharging to a voltage of 3 V at 1C rate in constant current mode The thickness variations of the electrode assemblies measured by measuring the thicknesses of the electrode assemblies each time after one charging and discharging cycle.

Figure 12:
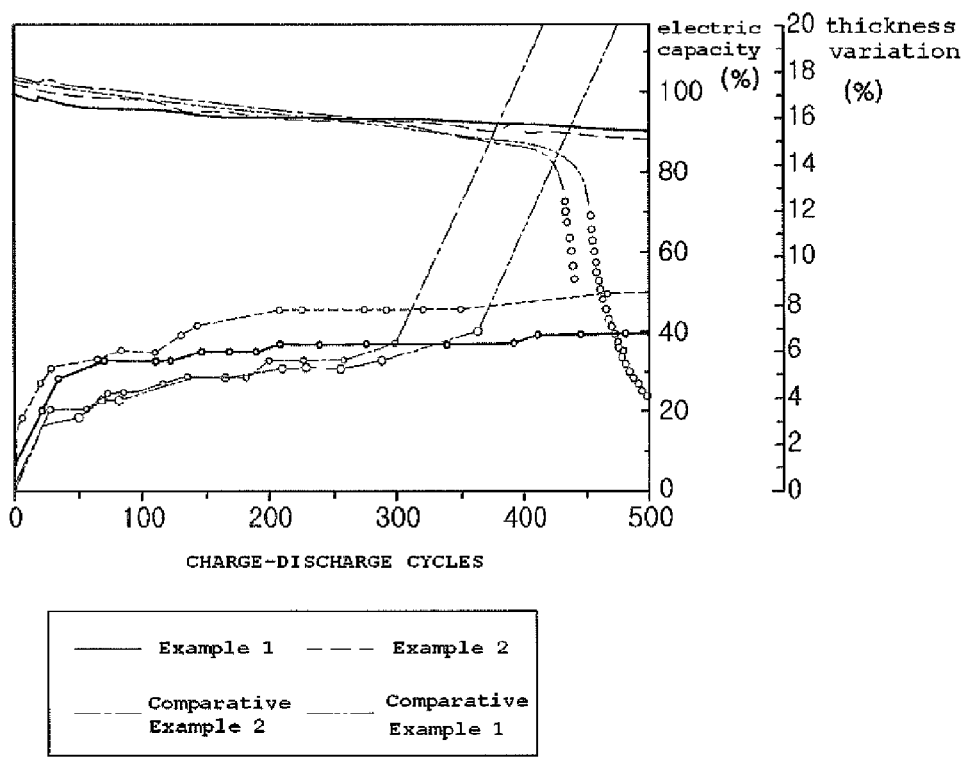
FIG. 12 is a graph illustrating electric capacities and thickness variations measured during 500 charging and discharging cycles of electrode assemblies fabricated according to Examples 1 and 2 of the present disclosure and Comparative Examples 1 and 2.

Measurement results are shown in FIG. 12. Referring to FIG. 12, in the case of the electrode assemblies manufactured according to Examples 1 and 2 of the present disclosure, electric capacities measured after 500 charging and discharging cycles are 80% or more of electric capacities measured after one charging and discharging cycle, and thickness variations are 10% or less. However, in the case of the electrode assemblies of Comparative Examples 1 and 2, electric capacities and thickness variations are markedly varied during a period from 400 cycles to 500 cycles.

Experimental Example 2

The positive electrode (A) and the negative electrode (E) were cut into 100 mm×120 mm, and were stacked with a separator being interposed therebetween to form a small-area electrode unit.

Then, negative electrodes 1 to 8 were manufactured in the same manner as in Manufacturing Example 3, except that the thicknesses of the negative electrodes 1 to 8 were varied, as shown in Table 2. The negative electrodes 1 to 8 had reversible capacities as shown in Table 2. Thereafter, the positive electrode (A) and the negative electrodes 1 to 8 were cut into 100 mm×150 mm, and were stacked with separators being disposed therebetween, so as to form large-area electrode units 1 to 8.

Then, small-area electrode units were placed on the large-area electrode units 1 to 8, respectively, so as to form electrode assemblies 1 to 8.

TABLE 2

| No. | Large-area N | Small-area P thicknesses (μm) | Porosity (%) | Reversible capacity (mAh) | N/P reversible capacity ratios at interfaces | N/P thickness ratios at interfaces |
|---|---|---|---|---|---|---|
| EA 1 | N 1 | 40 | 27 | 105 | 0.31 | 0.4 |
| EA 2 | N 2 | 50 | 27 | 141 | 0.42 | 0.5 |
| EA 3 | N 3 | 80 | 27 | 251 | 0.75 | 0.8 |
| EA 4 | N 4 | 110 | 27 | 360 | 1.07 | 1.1 |
| EA 5 | N 5 | 140 | 27 | 465 | 1.39 | 1.4 |
| EA 6 | N 6 | 170 | 27 | 574 | 1.71 | 1.7 |
| FA 7 | N 7 | 200 | 27 | 682 | 2.04 | 2.0 |
| EA 8 | N 8 | 220 | 27 | 753 | 2.25 | 2.2 |

EA: electrode assembly,
N: negative electrode,
P: positive electrode

The electrode assemblies 1 to 8 were charged and discharged once under the following charge and discharging conditions, and the electric capacities and voltages thereof were measured. The measured electric capacities and voltages were multiplied to calculate electrical energy values. Thereafter, the calculated electrical energy values were divided by the volumes of the electrode assemblies 1 to 8 to calculate energy densities per volume.

(1) Charging condition (A): charging to a voltage of 4.2V or 4.35 V at 1C rate in constant current mode, and then charging in constant voltage mode until a charging current reaches 1/20 of minimum battery capacity (2) Discharging condition (B): discharging to a voltage of 3 V at 1C rate in constant current mode (3) In addition, charging and discharging were performed at intervals of 10 minutes.

Figure 13:
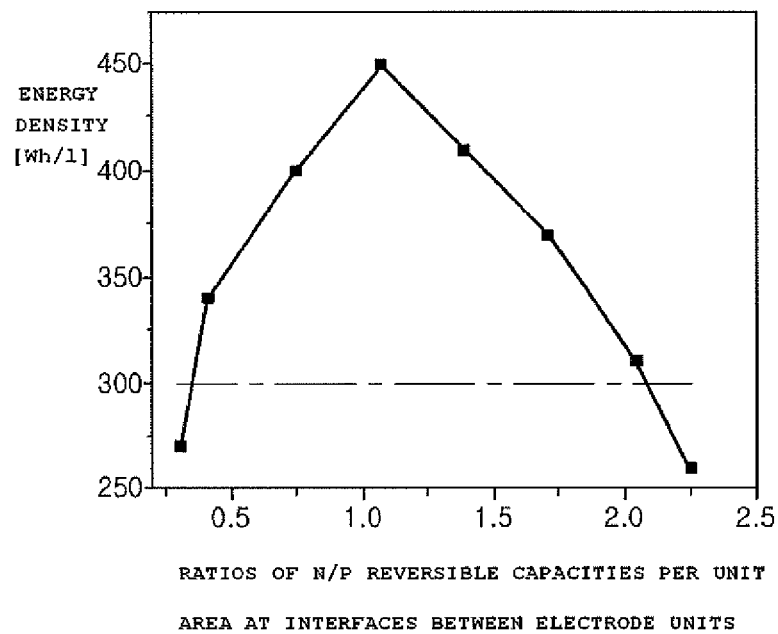
FIG. 13 is a graph illustrating energy density variations with respect to a reversible capacity ratio of negative electrode/positive electrode at interfaces between electrode units.
Figure 14:
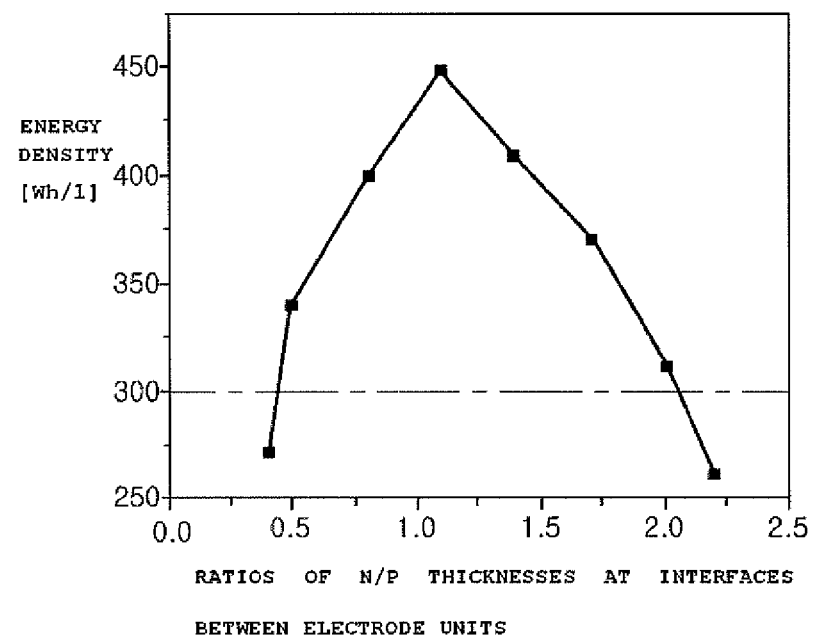
FIG. 14 is a graph illustrating energy density variations with respect to a thickness ratio of negative electrode/positive electrode at interfaces between electrode units.

Measured results are shown in FIGS. 13 and 14. FIG. 13 is a graph illustrating energy density variations with respect to the ratios of the reversible capacities per unit area of the negative electrodes to the reversible capacities per unit area of the positive electrodes at the interfaces between the electrode units. FIG. 14 is a graph illustrating energy density variations with respect to the thickness ratios of the negative electrodes to the positive electrodes at the interfaces between the electrode units.

Referring to FIG. 13, when the ratios of the reversible capacities per unit area of the negative electrodes to the reversible capacities per unit area of the positive electrodes at the interfaces between the electrode units are within the range of about 1 to about 1.5, particularly, about 1 to about 1.2, the energy density per unit volume is high. As shown in FIG. 12, if the reversible capacity ratios are 1 or less, a commercially level of energy density may be obtained. In this case, however, the electrical capacity of an electrode assembly is markedly lowered, and the thickness of the electrode assembly is markedly varied as mentioned in the description of Experimental Example 1. Commercialization may be difficult.

Referring to FIG. 14, when the thickness ratios of the negative electrodes to the positive electrodes at the interfaces between the electrode units are within the range of about 0.5 to about 2, the energy density per unit volume reaches a commercially required level of 300 Wh/l or higher. When the thickness ratios are within the range of about 0.6 to about 1.9, the energy density per unit volume reaches a high level of 350 Wh/l or more. Particularly, when the thickness ratios are within the range of about 0.8 to about 1.5, the energy density per unit volume reaches a very high level of 400 Wh/l or more.

The invention claimed is:

1. An electrode assembly comprising a combination of two or more electrode units having the same width and different lengths,
wherein the electrode units are stacked so that a stepped portion is formed between the electrode units,
a positive electrode and a negative electrode face each other at an interface between the electrode units,
wherein each of the electrode units is selected from the group consisting of a single electrode, a stacked type unit cell, a jelly-roll type unit cell, a stacked and folded type unit cell, and any combination thereof, and
the electrode assembly satisfies Formula 1-2 to prevent swelling:

$$1 \leq N_n/P_n \leq N_n/P_{n+1} \leq 1.2 \qquad \text{Formula 1-2:}$$

where n denotes an integer equal to or greater than 1,
$N_n$ denotes reversible capacity per unit area of a negative electrode of the nth longest electrode unit,
$P_n$ denotes reversible capacity per unit area of a positive electrode of the nth longest electrode unit, and
$P_{n+1}$ denotes reversible capacity per unit area of a positive electrode of the (n+1)th longest electrode unit.

2. The electrode assembly of claim 1, wherein at the interface between the electrode units having the same width and different lengths, a negative electrode of a relatively long electrode unit faces a positive electrode of a relatively short electrode unit.

3. The electrode assembly of claim 1, wherein after 500 charging and discharging cycles at 25° C. under a charging condition (A) and a discharging condition (B), the electrode assembly has 60% or more of an electrical capacity measured after one charging and discharging cycle, and an overall thickness of the electrode assembly is varied by 15% or less as compared with an overall thickness measured after one charging and discharging cycle,
wherein in the charging condition (A), the electrode assembly is charged to a voltage of 4.2 V or 4.35 V at 1C rate in a constant current mode, and a current is supplied to the electrode assembly in a constant voltage mode until the current reaches 1/20 of a battery minimal capacity, and
in the discharging condition (B), the electrode assembly is discharged at 1C rate to a voltage of 3 V in a constant current mode.

4. The electrode assembly of claim 1, wherein the electrode assembly satisfies Formula 2:

$$N_n/P_n \leq N_n/P_{n+1} \leq N_{n+1}/P_{n+1} \leq N_{n+1}/P_{n+2} \qquad \text{Formula 2:}$$

where n denotes an integer equal to or greater than 1,
$N_n$ denotes the reversible capacity per unit area of the negative electrode of the nth longest electrode unit,
$N_{n+1}$ denotes reversible capacity per unit area of a negative electrode of the (n+1)th longest electrode unit,
$P_n$ denotes the reversible capacity per unit area of the positive electrode of the nth longest electrode unit,
$P_{n+1}$ denotes the reversible capacity per unit area of the positive electrode of the (n+1)th longest electrode unit, and
$P_{n+2}$ denotes reversible capacity per unit area of a positive electrode of the (n+2)th longest electrode unit.

5. The electrode assembly of claim 4, wherein the electrode assembly satisfies Formula 2-1:

$$1 \leq N_n/P_n \leq N_n/P_{n+1} \leq N_{n+1}/P_{n+1} \leq N_{n+1}/P_{n+2} \qquad \text{Formula 2-1:}$$

where n denotes an integer equal to or greater than 1,
$N_n$ denotes the reversible capacity per unit area of the negative electrode of the nth longest electrode unit,
$N_{n+1}$ denotes the reversible capacity per unit area of the negative electrode of the (n+1)th longest electrode unit,
$P_n$ denotes the reversible capacity per unit area of the positive electrode of the nth longest electrode unit,
$P_{n+1}$ denotes the reversible capacity per unit area of the positive electrode of the (n+1)th longest electrode unit, and
$P_{n+2}$ denotes the reversible capacity per unit area of the positive electrode of the (n+2)th longest electrode unit.

6. The electrode assembly of claim 4, wherein the (n+2)th longest electrode unit is disposed between the nth longest electrode unit and the (n+1)th longest electrode unit,
wherein the electrode assembly satisfies Formula 3:

$$N_n/P_{n+2} \leq N_{n+1}/P_{n+2} \qquad \text{Formula 3:}$$

where n denotes an integer equal to or greater than 1,
$N_n$ denotes the reversible capacity per unit area of the negative electrode of the nth longest electrode unit,
$N_{n+1}$ denotes the reversible capacity per unit area of the negative electrode of the (n+1)th longest electrode unit, and
$P_{n+2}$ denotes the reversible capacity per unit area of the positive electrode of the (n+2)th longest electrode unit.

7. The electrode assembly of claim 1, wherein the electrode assembly satisfies Formula 4:

$$dN_n/dP_n \leq dN_n/dP_{n+1} \qquad \text{Formula 4:}$$

where n denotes an integer equal to or greater than 1,
$dN_n$ denotes a thickness of the negative electrode of the nth longest electrode unit,
$dP_n$ denotes a thickness of the positive electrode of the nth longest electrode unit, and
$dP_{n+1}$ denotes a thickness of the positive electrode of the (n+1)th longest electrode unit.

8. The electrode assembly of claim 1, wherein the electrode assembly satisfies Formula 4-1:

$$0.5 \leq dN_n/dP_n \leq dN_n/dP_{n+1} \leq 2 \qquad \text{Formula 4-1:}$$

where n denotes an integer equal to or greater than 1,
$dN_n$ denotes a thickness of the negative electrode of the nth longest electrode unit,
$dP_{n+1}$ denotes a thickness of the positive electrode of the nth longest electrode unit, and
$dP_{n+1}$ denotes a thickness of the positive electrode of the (n+1)th longest electrode unit.

9. The electrode assembly of claim 1, wherein the electrode assembly satisfies Formula 5:

$$dN_n/dP_n \leq dN_n/dP_{n+1} \leq dN_{n+1}/dP_{n+1} \leq dN_{n+1}/dP_{n+2} \qquad \text{Formula 5:}$$

where n denotes an integer equal to or greater than 1,
$dN_n$ denotes a thickness of the negative electrode of the nth longest electrode unit,
$dN_{n+1}$ denotes a thickness of a negative electrode of the (n+1)th longest electrode unit,
$dP_n$ denotes a thickness of the positive electrode of the nth longest electrode unit, and
$dP_{n+1}$ denotes a thickness of the positive electrode of the (n+1)th longest electrode unit, and
$dP_{n+2}$ denotes a thickness of a positive electrode of the (n+2)th longest electrode unit.

10. The electrode assembly of claim 1, wherein the electrode assembly satisfies Formula 5-1:

$$0.5 \leq dN_n/dP_n \leq dN_n/dP_{n+1} \leq dN_{n+1}/dP_{n+1} \leq dN_{n+1}/dP_{n+2} \leq 2 \qquad \text{Formula 5-1:}$$

where
n denotes an integer equal to or greater than 1,
$dN_n$ denotes a thickness of the negative electrode of the nth longest electrode unit,
$dN_{n+1}$ denotes a thickness of a negative electrode of the (n+1)th longest electrode unit,
$dP_n$ denotes a thickness of the positive electrode of the nth longest electrode unit, and
$dP_{n+1}$ denotes a thickness of the positive electrode of the (n+1)th longest electrode unit, and
$dP_{n+2}$ denotes a thickness of a positive electrode of the (n+2)th longest electrode unit.

11. The electrode assembly of claim 9, wherein the (n+2)th longest electrode unit is disposed between the nth longest electrode unit and the (n+1)th longest electrode unit,
wherein the electrode assembly satisfies Formula 6:

$$dN_n/dP_{n+2} \leq dN_{n+1}/dP_{n+2} \qquad \text{Formula 6:}$$

where n denotes an integer equal to or greater than 1,
$dN_n$ denotes the thickness of the negative electrode of the nth longest electrode unit,
$dN_{n+1}$ denotes the thickness of the negative electrode of the (n+1)th longest electrode unit, and
$dP_{n+2}$ denotes the thickness of the positive electrode of the (n+2)th longest electrode unit.

12. The electrode assembly of claim 1, wherein the electrode assembly comprises three or more kinds of electrode units having different lengths,
wherein a ratio of reversible capacity per unit area of a negative electrode to reversible capacity per unit area of a positive electrode facing the negative electrode at an interface between the electrode units is 1 or is increased as contact areas between the electrode units are decreased.

13. The electrode assembly of claim 1, wherein at least one unit cell includes at least one positive electrode, at least one negative electrode, and at least one separator.

14. The electrode assembly of claim 1, wherein electrodes and unit cells of the electrode units are partially or entirely surrounded by at least one long sheet of separation film.

15. The electrode assembly of claim 13, wherein electrodes disposed on both outermost sides of the unit cell have the same polarity.

16. The electrode assembly of claim 13, wherein electrodes disposed on both outermost sides of the unit cell have different polarities.

17. The electrode assembly of claim 1, wherein each of the electrode units has a rectangular sectional shape, a rectangular sectional shape having at least one curved corner, or a sectional shape having at least one curved side.

18. The electrode assembly of claim 1, wherein the electrode units have the same sectional shape.

19. The electrode assembly of claim 1, wherein the electrode units comprise one or more electrode tabs, and
the electrode tabs are stacked in such a manner that electrode tabs of the same polarity are overlapped with each other.

20. The electrode assembly of claim 19, wherein the electrode tabs have different sizes.

21. The electrode assembly of claim 1, wherein the electrode units are arranged in such a manner that the lengths of the electrode units decrease in a direction from a lower side to an upper side of the electrode assembly.

22. The electrode assembly of claim 1, wherein the electrode units are arranged in such a manner that the lengths of the electrode units increase in a direction from a lower side to an upper side of the electrode assembly.

23. The electrode assembly of claim 1, wherein the longest electrode unit of the electrode units is disposed in a middle layer of the electrode assembly.

24. The electrode assembly of claim 1, wherein the electrode units are arranged in such a manner that planar center points of the electrode units are aligned with each other.

25. The electrode assembly of claim 1, wherein the electrode units are arranged in such a manner that planar center points of the electrode units are arranged with predetermined intervals therebetween.

26. The electrode assembly of claim 1, wherein the electrode units are arranged in such a manner that widthwise sides of the electrode units are aligned with each other.

27. A battery cell comprising:
the electrode assembly of claim 1 and;
a battery case accommodating the electrode assembly.

28. The battery cell of claim 27, wherein the battery case is a pouch type case.

29. The battery cell of claim 27, wherein the battery case has a shape corresponding to a shape of the electrode assembly.

30. The battery cell of claim 27, wherein the battery cell is a lithium ion secondary battery or a lithium ion polymer secondary battery.

31. A device comprising at least one battery cell as claimed in claim 27.

32. The device of claim 31, wherein a system component of the device is disposed in a remaining space of the battery cell.

33. The device of claim 32, wherein the device is a cellular phone, a portable computer, a smartphone, a smartpad, a net book, an LEV (light electronic vehicle), an electric vehicle, a hybrid electric vehicle, a plug-in hybrid electric vehicle, or a power storage device.

34. The electrode assembly of claim 1, wherein two of the electrode units are different ones selected from the group consisting of the single electrode, the stacked type unit cell, the jelly-roll type unit cell, the stacked and folded type unit cell, and any combination thereof.

* * * * *